(12) United States Patent
Armstrong et al.

(10) Patent No.: US 12,548,845 B2
(45) Date of Patent: Feb. 10, 2026

(54) FLEXIBLE, EXTENSIBLE, BATTERY MANAGEMENT SYSTEMS

(71) Applicant: Electric Power Systems, Inc., North Logan, UT (US)

(72) Inventors: Michael Armstrong, North Logan, UT (US); Nathan Millecam, North Logan, UT (US); Kurt Rose, North Logan, UT (US); Cory Newman, North Logan, UT (US)

(73) Assignee: ELECTRIC POWER SYSTEMS, INC., North Logan, UT (US)

( * ) Notice: Subject to any disclaimer, the term of this patent is extended or adjusted under 35 U.S.C. 154(b) by 0 days.

(21) Appl. No.: 18/682,397

(22) PCT Filed: Aug. 18, 2022

(86) PCT No.: PCT/US2022/040808
§ 371 (c)(1),
(2) Date: Feb. 8, 2024

(87) PCT Pub. No.: WO2023/023284
PCT Pub. Date: Feb. 23, 2023

(65) Prior Publication Data
US 2024/0266664 A1 Aug. 8, 2024

Related U.S. Application Data

(60) Provisional application No. 63/313,660, filed on Feb. 24, 2022, provisional application No. 63/234,489, filed on Aug. 18, 2021.

(51) Int. Cl.
*H01M 50/267* (2021.01)
*H01M 10/48* (2006.01)
(Continued)

(52) U.S. Cl.
CPC ....... *H01M 50/267* (2021.01); *H01M 10/482* (2013.01); *H01M 50/269* (2021.01); *H01M 50/574* (2021.01); *H02J 7/0013* (2013.01)

(58) Field of Classification Search
CPC ............. H01M 50/267; H01M 50/269; H01M 50/574; H01M 10/482; H01M 10/48;
(Continued)

(56) References Cited

U.S. PATENT DOCUMENTS

2002/0022159 A1 2/2002 Pierson et al.
2005/0110458 A1 5/2005 Seman, Jr. et al.
(Continued)

FOREIGN PATENT DOCUMENTS

DE 102019110177 10/2020
EP 2493003 8/2012
(Continued)

OTHER PUBLICATIONS

International Bureau, International Preliminary Report on Patentability dated Feb. 13, 2024 in PCT Serial No. PCT/US2022/040808.
(Continued)

*Primary Examiner* — Adam J Francis
(74) *Attorney, Agent, or Firm* — SNELL & WILMER L.L.P.

(57) ABSTRACT

An adaptable battery management system can comprise a first termination module and a second termination module. The first termination module can include a portion of a control system for the adaptable battery management system and the second termination module can include a second portion of the control system. The first termination module can be located at separate locations in a string of battery modules (e.g., at a high-side and a low side, at a high side and a mid-point side, or at a combined high-side/low side and a mid-point side).

30 Claims, 21 Drawing Sheets

(51) Int. Cl.
*H01M 50/269* (2021.01)
*H01M 50/574* (2021.01)
*H02J 7/00* (2006.01)

(58) Field of Classification Search
CPC .......... H01M 10/00; H02J 7/0013; H02J 7/00; B60L 58/21; B60L 50/64; Y02E 60/10
See application file for complete search history.

(56) References Cited

U.S. PATENT DOCUMENTS

| | | | |
|---|---|---|---|
| 2006/0076923 | A1 | 4/2006 | Eaves |
| 2008/0169788 | A1 | 7/2008 | Bobbin et al. |
| 2008/0233469 | A1* | 9/2008 | Drozdz .............. H02J 7/00712 429/61 |
| 2013/0288530 | A1 | 10/2013 | Zhao |
| 2018/0175430 | A1 | 6/2018 | Modderno et al. |
| 2019/0123318 | A1* | 4/2019 | Fees ...................... H01M 50/51 |
| 2022/0037891 | A1* | 2/2022 | Berning ................ H02J 7/0013 |
| 2022/0123403 | A1* | 4/2022 | Lee ..................... H01M 10/425 |

FOREIGN PATENT DOCUMENTS

| | | |
|---|---|---|
| WO | 2013099229 | 7/2013 |
| WO | 2018058137 | 3/2018 |
| WO | 2020102138 | 5/2020 |
| WO | 2021101735 | 5/2021 |
| WO | 2023009633 | 2/2023 |
| WO | 2023023284 | 2/2023 |

OTHER PUBLICATIONS

International Searching Authority, International Search Report and Written Opinion date Oct. 31, 2022 in PCT Serial No. PCT/US2022/040808.

International Searching Authority, International Search Report and Written Opinion date Dec. 28, 2022 in PCT Serial No. PCT/US2022/038537.

EPO, Extended European Search Report dated Jan. 8, 2025 in EP Serial No. 22859188.9.

European Patent Office, European Office Action dated Oct. 1, 2025 in Application No. 22859188.9.

* cited by examiner

FLEXIBLE, EXTENSIBLE, BATTERY MANAGEMENT SYSTEMS

CROSS REFERENCE TO RELATED APPLICATIONS

This application is a U.S. national stage entry under 35 U.S.C. § 371 of International Application No. PCT/US2022/040808 filed Aug. 18, 2022 entitled "FLEXIBLE, EXTENSIBLE, BATTERY MANAGEMENT SYSTEMS" (hereinafter the '808 PCT). The '808 PCT claims priority to, and the benefit of, U.S. Provisional Application Ser. No. 63,234,489 filed on Aug. 18, 2021, entitled "FLEXIBLE, EXTENSIBLE, BATTERY MANAGEMENT SYSTEMS" and U.S. Provisional Application Ser. No. 63/313,660 filed on Feb. 24, 2022, entitled "COMMON BATTERY MODULES INTERFACES FOR MICROGRID SYSTEMS." Each of the foregoing applications are hereby incorporated by reference in their entirety for all purposes.

FIELD OF INVENTION

The present disclosure generally relates to apparatus, systems and methods for flexible, extensible battery module units for integration with interconnected battery modules.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

A battery module, for purposes of this disclosure, includes a plurality of electrically connected cell-brick assemblies. These cell-brick assemblies may, in turn, include a parallel, series, or combination of both, collection of electrochemical or electrostatic cells hereafter referred to collectively as "cells", that can be charged electrically to provide a static potential for power or released electrical charge when needed. When cells are assembled into a battery module, the cells are often linked together through metal strips, straps, wires, bus bars, etc., that are welded, soldered, or otherwise fastened to each cell to link them together in the desired configuration.

A cell may be comprised of at least one positive electrode and at least one negative electrode. One common form of such a cell is the well-known secondary cells packaged in a cylindrical metal can or in a prismatic case. Examples of chemistry used in such secondary cells are lithium cobalt oxide, lithium manganese, lithium iron phosphate, nickel cadmium, nickel zinc, and nickel metal hydride. Such cells are mass produced, driven by an ever-increasing consumer market that demands low cost rechargeable energy for portable electronics.

Custom battery solutions may be expensive for a respective customer. Custom battery solutions may include longer lead times due to the customization desired by the customer. Custom battery solutions may be engineering intensive to meet desired characteristics by a customer.

SUMMARY

Disclosed herein is an adaptable battery management system of a battery system. In various embodiments, the adaptable battery management system comprises a high-side circuit and a low-side circuit. The high-side circuit and the low-side circuit can be disposed in separate distinct termination modules, or within the same termination module.

In various embodiments, the adaptable battery management system can further comprise a mid-point termination module. The mid-point termination module can be disposed within a string of battery modules between the high-side circuit and the low-side circuit. In this regard, the mid-point termination module can provide data from a mid-point of a string of battery modules to a control system (e.g., within a separate distinct termination module) to provide a greater amount of data points for operating the adaptable battery management system, in accordance with various embodiments.

In various embodiments, a control system of the adaptable battery management system can be disposed in multiple separate and distinct termination modules.

In various embodiments, the adaptable battery management system disclosed herein is flexible and extensible. In this regard, termination modules, paralleling modules, and/or output modules of the adaptable battery management system can facilitate easily retrofittable components for a battery management system. In this regard, a termination module, a paralleling module, and/or an output module as disclosed herein can be easily replaced in response to an upgrade in software or the like.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and where:

DETAILED DESCRIPTION

Figure 1A:
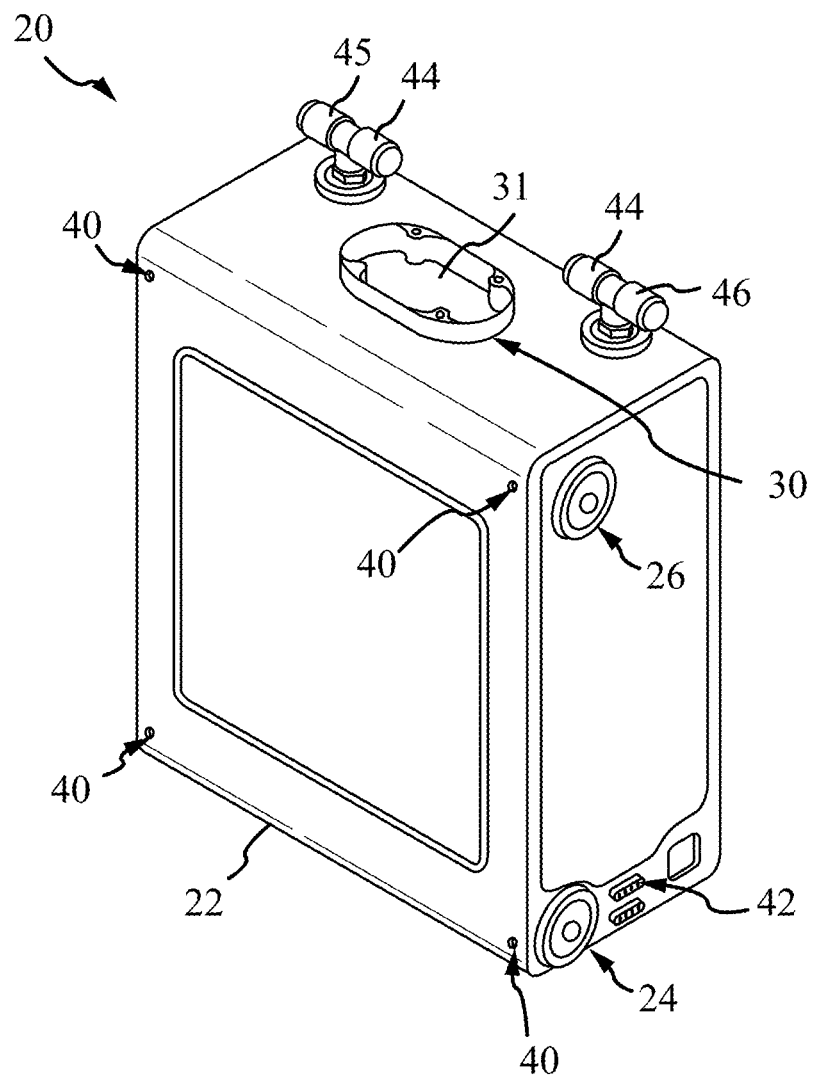
FIG. 1A illustrates a perspective view of an interconnected battery module for use in various battery systems, in accordance with various embodiments.

The following description is of various example embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent example functional relationships and/or physical couplings between various elements. It should be noted that many alternative or additional functional relationships or physical connections may be present in a modular structure.

Disclosed herein, is an adaptable battery management system that is flexible and extensible. "Extensible", as described herein, refers to a battery system architecture that is designed to allow the addition of new capabilities and functionality. In various embodiments, the adaptable battery management system may provide an ability for a battery pack manufacturer to apply combinations of standard modules with the adaptable battery management system in a reconfigurable manner. In other words, the battery management system may be adaptable to various sizes and configurations of interconnected battery modules with little to no changes to the termination modules of the adaptable battery system, as described further herein.

In various embodiments, the battery management system allows flexibility in a battery system. For example, a number of battery modules in a string may be varied, a number of strings in parallel may be varied, and a number of loads of the battery system may be varied, in accordance with various embodiments.

In various embodiments, the reconfigurable nature of the battery management system may provide integrated protection capabilities through distributing protection functions throughout the battery system (e.g., protection functions distributed between termination blocks).

In various embodiments, the adaptable battery management system disclosed herein may be customizable to various battery applications and designs with little upfront costs for integration. In various embodiments, the reconfigurable nature of the battery management system may produce economies of scale on pricing of battery systems with the adaptable battery management system. In various embodiments, by having similar components for the adaptable battery management systems in various applications and platforms, maintenance time and costs may be reduced.

In various embodiments, the adaptable battery management system of the battery system disclosed herein includes a high side termination module and a low side termination module. In various embodiments, the adaptable battery management system may perform various functions associated with a typical battery management system through distinct, and independent components (e.g., the high side termination module, the low side termination module, and/or a mid-point termination module). For example, a control system for a string of battery modules may be disposed in the high side termination module and a fuse plug may be disposed in the low side termination module, in accordance with various embodiments. Although described herein as having specific components in specific termination modules, the present disclosure is not limited in this regard. For example, any component may be disposed in any of the respective termination modules (e.g., high side, low side, and/or mid-point termination modules), and any function may be performed by any of the respective termination modules (e.g., high side, low side, and/or mid-point termination modules), in accordance with various embodiments.

In various embodiments, each module in the battery management system may have a common interface with interconnected battery modules of the battery system. In this regard, any module (e.g., high side termination module, low side termination module, mid-point termination module, or interconnected battery module) could be electrically and mechanically coupled to any other module (e.g., high side termination module, low side termination module, mid-point termination module, or interconnected battery module). In various embodiments, the common interface may be accomplished without a wiring harness but through a direct module to module physical connection. In this regard, in various embodiments, wiring can be eliminated from the adaptable battery management system. Although described herein as having a potential to eliminate wiring, the present disclosure is not limited in this regard, and an adaptable battery management system that includes wiring at some locations is still within the scope of this disclosure.

An adaptable battery management system, as disclosed herein may comprise a battery bus, a battery control system, a sensor (e.g., a current sensor), a fuse, contactors (e.g., pre-charge contactor and/or electrical contactor), and charging interface(s). In various embodiments, the adaptable battery management system may include the above elements in separate distinct termination modules, as described further herein. In this regard, the adaptable battery management system may be more compact relative to a typical battery management system that is centrally located, in accordance with various embodiments. In various embodiments, the adaptable battery management system may be reconfigurable for various voltage and current specifications. Battery modules for typical battery management systems are designed and customized to fit a respective battery management system. In various embodiments, integrating typical battery management systems with typical battery modules may result in long wiring harness routings to provide the centrally managed distribution, which may add weight and reduce robustness of the battery system. In various embodiments, the adaptable battery management system disclosed herein may facilitate a non-wired battery system with hard, physical, connections (e.g., without the use of wireless signals or communication through an unguided communication), but without external wire or cable harnesses except those providing power or communications with the vehicle. "Non-wired" as disclosed herein means without external physical wires/cables. "Non-wired" as disclosed herein includes maintaining a physical electrical path.

Also disclosed herein are battery modules (and termination modules) having common interfaces for a battery system (e.g., a charging system and/or an aircraft battery system). For example, the charging system may have a plumbing system, a communication system, a venting system, and/or electrical connections between adjacent battery modules. Similarly, the aircraft battery system may have a plumbing system, a communication system, a venting system, and/or electrical connections between adjacent battery modules. Locally, couplings between external components of the charging system to a respective module (e.g., battery module, termination module, or the like) may be identical, or nearly identical to facilitate assembly and ease of reconfigurability.

Referring now to FIG. 1A, a perspective view of an interconnected battery module ("ICBM") 20 is illustrated, in accordance with various embodiments. In various embodiments the ICBM 20 includes a housing 22 and a plurality of cells disposed within the housing 22. The plurality of cells are in electrical communication with power connections 24 disposed on opposite sides of the housing 22. The power connections 24 include a positive terminal and a negative terminal. In various embodiments, the plurality of cells are a plurality of pouch cells, a plurality of cylindrical cells, a plurality of prismatic cells, or the like. The present disclosure is not limited in this regard. In various embodiments, the power connections 24 are configured to physically, and electrically coupled the ICBM 20 to an adjacent ICBM 20. The ICBM 20 can further comprise mechanical connections 26. In this regard, the mechanical connections 26 can provide structural stability between adjacent ICBMs in a battery system as described further herein.

In various embodiments, the power connections 24 include a positive terminal on a first side and a negative terminal on a second side opposite the first side. The positive terminal is configured to electrically and physically couple to a negative terminal of an adjacent ICBM in an interconnected battery system described further herein. Similarly, the negative terminal is configured to electrically and physically couple to a positive terminal of an adjacent ICBM in an interconnected battery system. In this regard, the ICBMs of an interconnected battery system may be configured for electrical and physical coupling in series electrically and may be configured with an additional component to create a parallel electrical connection, in accordance with various embodiments. The present disclosure is not limited in this regard. For example, the interconnected battery system may be configured to couple adjacent ICBMs in parallel as a default configuration instead of in series as a default configuration and still be within the scope of this disclosure.

In various embodiments, the housing 22 includes a vent connection 30. In various embodiments, the vent connection 30 is configured to fluidly couple a vent port 31 to an exhaust system for a battery system as described further herein. In this regard, the vent connection 30 may comprise a common interface with an exhaust system for multiple battery systems, as described further herein, to facilitate swapping between battery systems for secondary life, or for primary life after being in inventory, in accordance with various embodiments. The vent port 31 comprises a fluid outlet in fluid communication with an internal cavity of the housing 22. The plurality of cells are also disposed in the internal cavity. In this regard, any ejecta, gases, or foreign object debris ("FOD") from a thermal runaway event may be configured to be expelled out the vent port 31 and into an exhaust system of a respective battery system. In various embodiments, the vent connection 30 is disposed on a top surface of the housing.

In various embodiments, the housing 22 of the ICBM 20 comprises mounting connections 40 (e.g., physical mounting connections). The mounting connections 40 are configured to mount to a support structure in a respective battery system. In various embodiments, the mounting connections 40 may be disposed on opposite sides of the housing 22. However, the present disclosure is not limited in this regard. The mounting connections 40 may comprise a common interface with a support structure for multiple battery systems (e.g., a charging system and an electrically powered propulsion system), as described further herein.

In various embodiments, the ICBM 20 further comprises battery management connections 42. The battery management connections 42 may comprise daisy chain communication interfaces or the like. In this regard, the battery management connections 42 are configured to interface with adjacent ICBMs in accordance with ICBM 20 in a battery system and communicate data from the ICBM 20 down a line of adjacent ICBMs. In an example embodiment, the data from the various ICBMs is communicated to a master battery management system, in accordance with various embodiments. However, in other example embodiments, the battery management system is implemented in a distributed manner, or otherwise. This method of data communication may facilitate installing adjacent array of battery modules and maintaining data communication for a battery management system for various battery systems (e.g., a charging system and an electrically powered propulsion system), as described further herein.

In various embodiments, the ICBM 20 further comprises thermal management connections 44. The thermal management connections 44 are fluid connections, such as fittings, adapters, ferrules, or any type of fluid coupling known in the art. In various embodiments, the thermal management connections 44 comprise an inlet fitting 45 and an outlet fitting 46. In this regard, the ICBM 20 is configured to receive a fluid from the inlet fitting 45, which travels through the housing 22 and is configured to cool or heat a plurality of cells disposed within the housing 22, in accordance with various embodiments. In various embodiments, the thermal management connections 44 are adaptable to a battery system for an aircraft and adaptable for a charging system (e.g., a mobile charging system) as described further herein.

In various embodiments, as described further herein, termination modules can comprise similar, or the same connections of the ICBM 20. For example, with reference now to FIG. 1B, a battery management module 50 (e.g., termination modules 112, 114, 116, 118, 119, paralleling modules 512, 514, 522, 524, 532, 534, etc. as disclosed further herein) can comprise a housing 52, power connections 24, mechanical connections 26, mounting connections 40, battery management connections 42, and/or thermal management connections 44. In this regard, the termination module 50 can be configured to be electrically and physically coupled to an ICBM 20 as described further herein, in accordance with various embodiments. Although illustrated with thermal management connections 44, the present disclosure is not limited in this regard. For example, the battery management module 50 may not include thermal management connections 44 and be within the scope of this disclosure.

In various embodiments, by having common interfaces between the termination module 50 and the ICBM 20, the stack-ability and/or reconfigurability of battery systems and battery managements systems can be facilitated, as described further herein. In various embodiments, the various connections of the battery management module can be rearranged on the housing 52 as disclosed further herein (e.g., two sets of power connection connections 24 could be provided for termination module 118 and/or termination module 119) to facilitate coupling to two distinct ICBMs 20 (e.g., two distinct of ICBM 20).

Figure 2A:
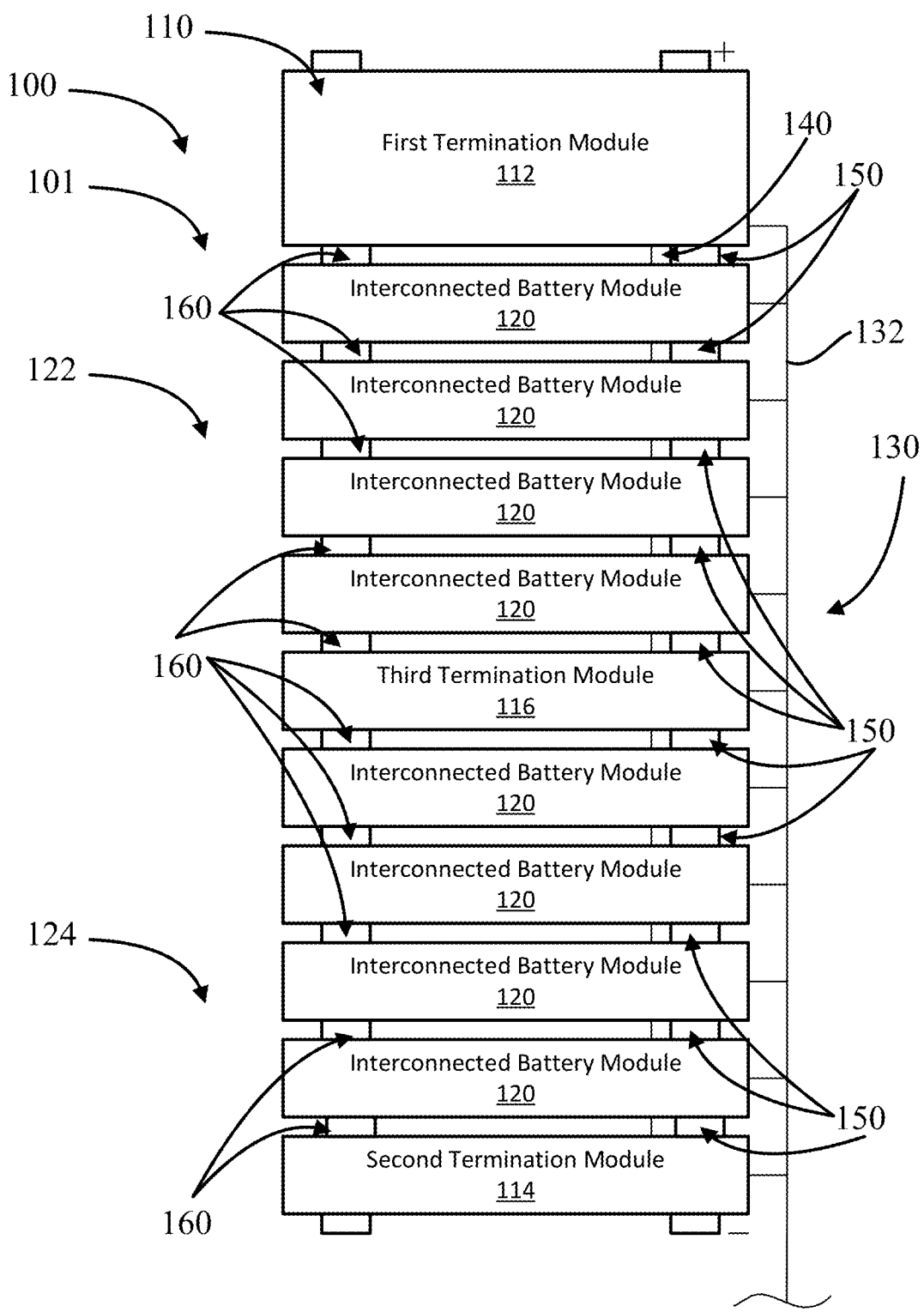
FIG. 2A illustrates a schematic view of a battery system with an adaptable battery management system, in accordance with various embodiments.
Figure 2B:
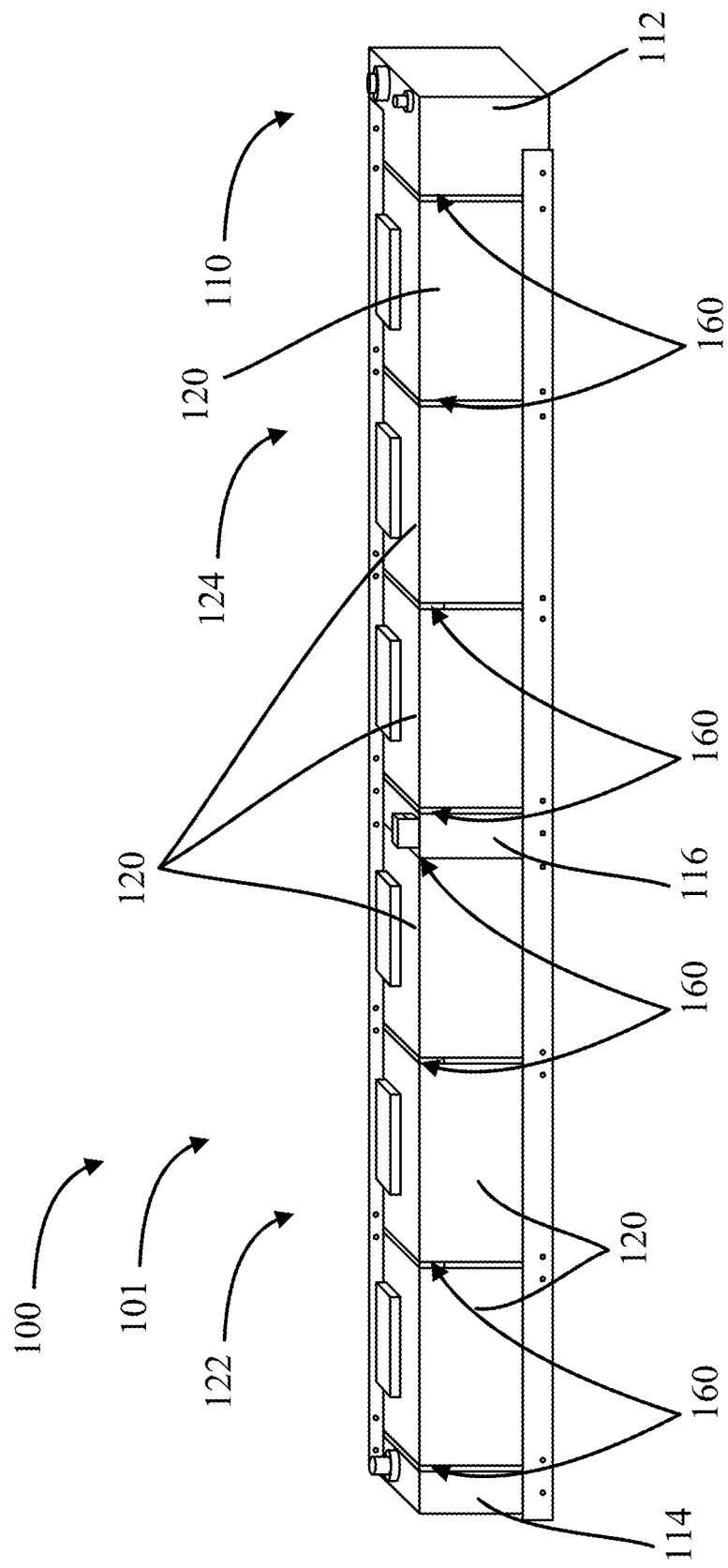
FIG. 2B illustrates a perspective view of a battery system with an adaptable battery management system, in accordance with various embodiments.

Referring now to FIGS. 2A and 2B, a schematic view of a battery system 100 (FIG. 2A) and a perspective view of a battery system 100 (FIG. 2B) with an adaptable battery management system 110 are illustrated, in accordance with various embodiments. The battery system 100 comprises the adaptable battery management system 110 and interconnected battery modules ("ICBMs") 120 (e.g., ICBM 20 from FIG. 1A). In a configured state, the ICBMs 120 are disposed between a first termination module 112 (e.g., high side termination module) of the adaptable battery management system 110 and a second termination module 114 (e.g., low side termination module) of the adaptable battery management system 110. In various embodiments, "high side" as described herein may refer to an electrically positive end of a sequence of ICBMs 120 and a "low side" may refer to an electrically negative end of a sequence of ICBMs 120 in a battery system 100.

In various embodiments, the adaptable battery management system 110 may further comprise a third termination module 116 disposed between the first termination module 112 and the second termination module 114. The third termination module 116 may further be disposed between a first set of interconnected battery modules 122 of the ICBMs 120 and a second set of interconnected battery modules 124 of the ICBMs 120. In various embodiments, the battery system 100 may comprise at least one string of battery modules 101 (e.g., the ICBMs 120 and the termination modules 112, 114, 116). A string of battery modules 101 may be electrically coupled to an adjacent string of battery modules in a parallel configuration to increase a current provided by the battery system 100, as described further herein.

In various embodiments, the battery system 100 may further comprise a cooling system 130 and a communication system 140. In various embodiments, the cooling system 130 is configured to cool (or heat) each module (e.g., ICBMs 120 and termination modules 112, 114, 116) in the battery system 100. In various embodiments, the cooling system 130 includes plumbing 132 (e.g., including thermal management connections 44 from FIGS. 1A and 1B) external to the modules (e.g., ICBMs 120 and termination modules 112, 114, 116) and internal to each module, as described further herein. In various embodiments, the communication system 140 may include a daisy chain wiring scheme extending from the first termination module 112 and electrically coupling the termination modules 112, 114, 116 through the ICBMs 120. In this regard, the communication system 140 provides an electrical communication path throughout the adaptable battery management system 110. For example, a controller disposed in the first termination module 112 may send a command signal to the second termination module 114 to perform various functions through the communication system 140, as described further herein.

In various embodiments, the battery system 100 may further comprise a plurality of electrical interfaces 150 (e.g., power connections 24 from FIGS. 1A and 1B) between adjacent modules (e.g., between adjacent ICBMs 120, between a termination module and an ICBM 120, etc.). In various embodiments, each electrical interface in the plurality of electrical interfaces 150 may include a first terminal from a first module (e.g., termination modules 112, 114, 116 and ICBMs 120) and a second terminal from a second module (e.g., termination modules 112, 114, 116 and ICBMs 120). In various embodiments, the electrical interfaces 150 may be configured to electrically couple a positive terminal of a first module (e.g., termination modules 112, 114, 116 and ICBMs 120) to a negative terminal of a second module (e.g., termination modules 112, 114, 116 and ICBMs 120). Thus, a default electrical connection between adjacent modules (e.g., between adjacent ICBMs 120, between a termination module and an ICBM 120, etc.) may be a series connection. Although described herein as having a series connection as a default electrical interface, the present disclosure is not limited in this regard. For example, the electrical interface 150 may be configured for parallel connections (i.e., negative terminal interfacing with an adjacent negative terminal), in accordance with various embodiments.

Figure 1B:
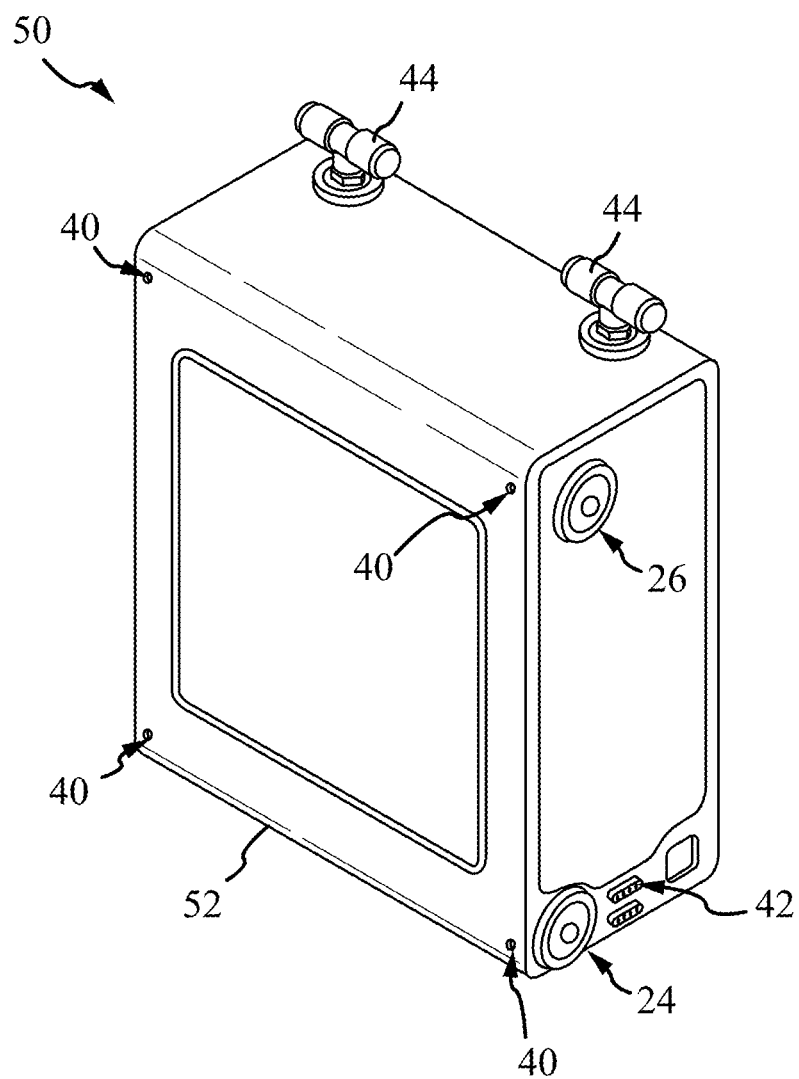
FIG. 1B illustrates a perspective view of an interconnected battery module for use in various battery systems, in accordance with various embodiments.

In various embodiments, the battery system 100 further comprises a plurality of mechanical interfaces 160 (e.g., mechanical connections 26 from FIGS. 1A and 1B). Each mechanical interface in the plurality of mechanical interfaces 160 (e.g., between modules, between modules and supporting structures, or the like) may provide structural support for the battery system 100. In various embodiments, the plurality of mechanical interfaces 160 and the plurality of electrical interfaces 150 may facilitate an adaptable battery management system 110 and a battery system 100 that are reconfigurable, stackable, and/or extensible.

In various embodiments, by having termination modules 112, 114, 116, with separate and distinct components/functions, any one of the termination modules 112, 114, 116 may be retrofitted with an updated termination module with more advanced technology in an adaptable battery management system 110 of a battery system 100 without replacing an entire adaptable battery management system 110. In this regard, upgrading and/or servicing the battery system 100 may be cheaper and quicker relative to typical battery systems.

Although illustrated as comprising a high side termination module (e.g., termination module 112) a low side termination module (e.g., termination module 116) disposed on opposite sides of the battery system 100, the present disclosure is not limited in this regard. For example, with reference now to FIG. 2C, the battery system 100 may comprise a termination module 118 configured as a high side termination module 112 and a low side termination module 116 from FIG. 2A and a mid-point termination module (e.g., termination module 119 from FIG. 2C) configured with electrical interfaces 150 disposed on the same side. In this regard, the mid-point termination module (e.g., termination module 119) may facilitate a set of ICBMs 172 disposed adjacent to a second set of ICBMs 174 in the plurality of ICBMs 120 while maintaining the batteries connected in series electrically, in accordance with various embodiments.

Figure 2C:
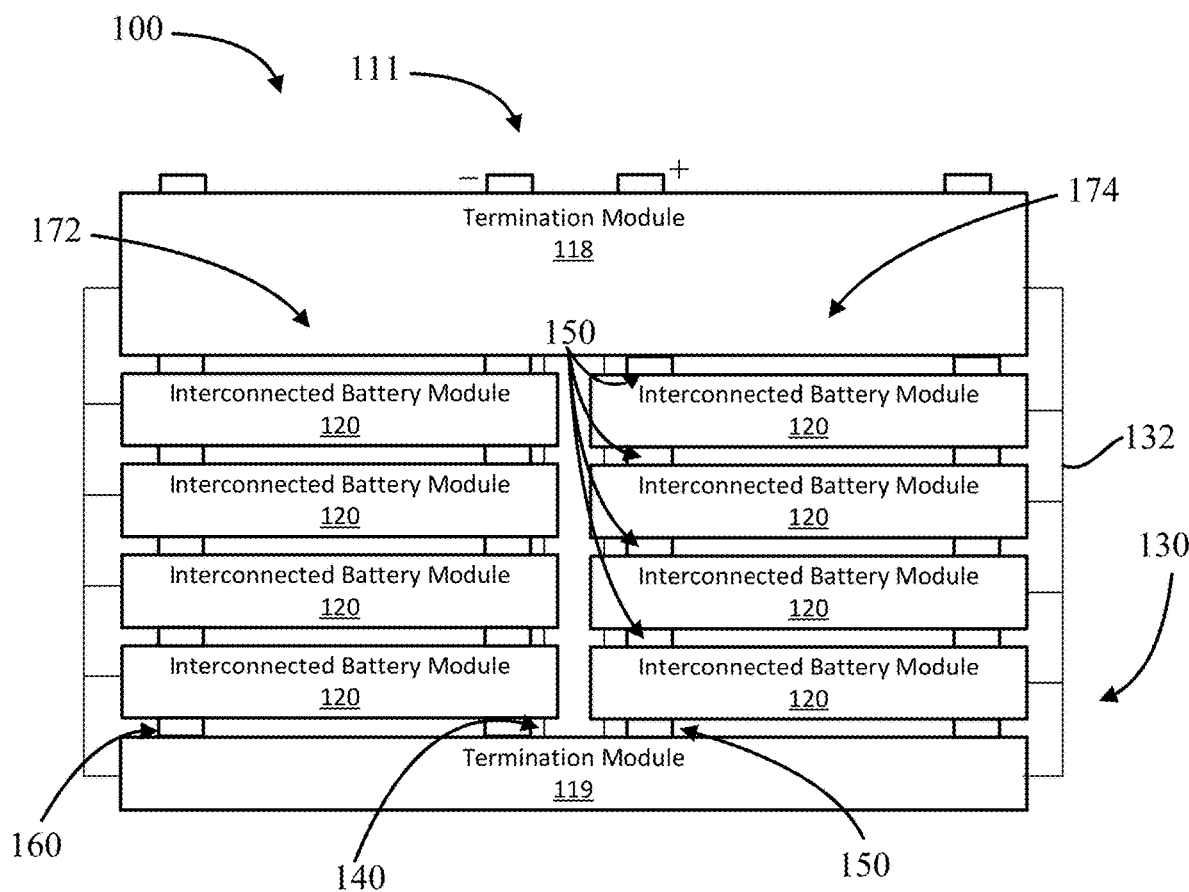
FIG. 2C illustrates a schematic view of a battery system with an adaptable battery management system, in accordance with various embodiments.
Figure 3:
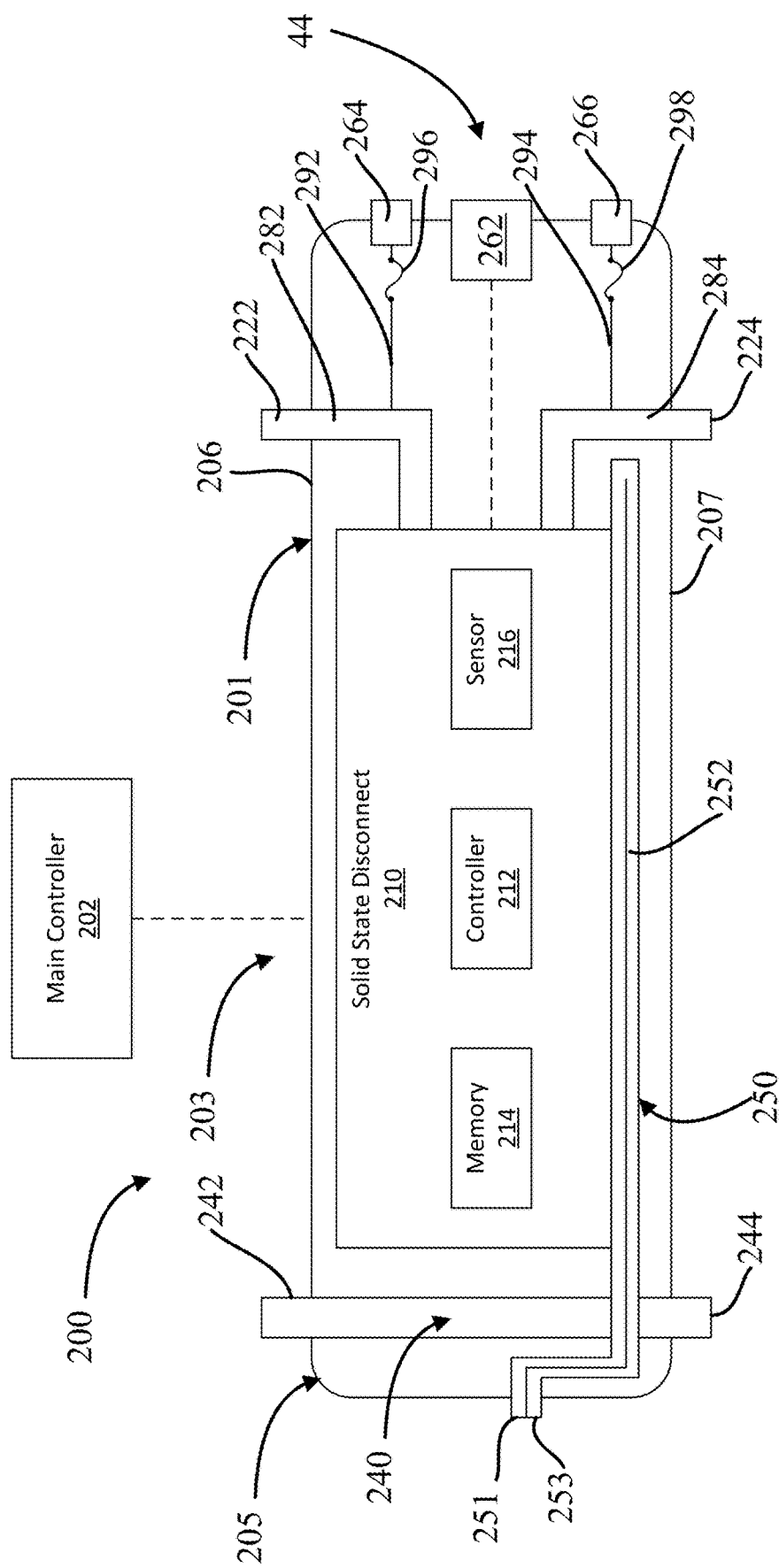
FIG. 3 illustrates a schematic view of a termination module for use in an adaptable battery management system, in accordance with various embodiments.

Referring now to FIG. 3, a control system 200 for an adaptable battery management system 110 from FIGS. 2A and 2B is illustrated, in accordance with various embodiments. In various embodiments, the control system 200 comprises a main controller 202. The main controller 202 may be disposed outside a housing 205 of a termination module 201. Although illustrated as being disposed outside the housing 205 the termination module 201, the present disclosure is not limited in this regard. For example, the main controller 202 may be disposed in the housing 205 of the termination module 201 and still be within the scope of this disclosure. In various embodiments, the main controller 202 can be disposed in any termination module disclosed herein (e.g., termination module 112 from FIG. 2A, termination module 116 from FIG. 2A, termination module 118 from FIG. 2C, an output module, a paralleling module, or any other non-interconnected battery module disclosed herein). In various embodiments, the housing 205 includes various electrical components disposed therein (e.g., the solid-state disconnect 210 and/or the main controller 202, positive terminal 222, negative terminal 224, etc.), various plumbing components (e.g., cooling apparatus 250).

In various embodiments, the termination module 201 comprises a solid-state disconnect circuit 203 disposed therein. The solid-state disconnect circuit 203 can comprise the solid-state disconnect 210 disposed electrically between the positive terminal 222 and the negative terminal 224 within the housing 205.

The main controller 202 comprises a processor. In various embodiments, the main controller 202 is implemented in a single processor. In various embodiments, the main controller 202 may be implemented as and may include one or more processors and/or one or more tangible, non-transitory memories and be capable of implementing logic. Each processor can be a general-purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. The main controller 202 may comprise a processor configured to implement various logical operations in response to execution of instructions, for example, instructions stored on a non-transitory, tangible, computer-readable medium configured to communicate with the main controller 202. Furthermore, any number of conventional techniques for electronics configuration, signal processing and/or control, data processing and the like may be employed. Also, the processes, functions, and instructions can include software routines in conjunction with processors, etc.

System program instructions and/or controller instructions may be loaded onto a non-transitory, tangible computer-readable medium having instructions stored thereon that, in response to execution by the processor, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the main controller 202 is configured to control the adaptable battery management system 110 from FIGS. 2A-2B. For example, the main controller 202 may be configured to manage remaining battery voltage, control battery charging, calculate data for the battery system 100, control an environment of the battery system 100, balance the battery system 100, etc.

In various embodiments, the control system 200 comprises a solid-state disconnect 210. Although described herein as including a solid-state disconnect, the control system 200 is not limited in this regard. For example, a hard disconnect, which includes a high current mechanical disconnect (contactor) or pyro-fuse, is also within the scope of this disclosure. The solid-state disconnect 210 is disposed within a termination module 201. In various embodiments, the termination module 201 may be the first termination module 112, the second termination module 114, or the third termination module 116 from FIGS. 2A and 2B. In various embodiments, the termination module 201 is the first termination module 112 (e.g., a high side termination module of a string of battery modules 101 from FIGS. 2A and 2B).

In various embodiments, the solid-state disconnect 210 includes a controller 212, a memory 214, and a sensor 216. In various embodiments, the controller 212 comprises a processor. In various embodiments, the controller 212 is implemented in a single processor. In various embodiments, the controller 212 may be implemented as and may include one or more processors and/or one or more tangible, non-transitory memories and be capable of implementing logic. Each processor can be a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. The controller 212 may comprise a processor configured to implement various logical operations in response to execution of instructions, for example, instructions stored on a non-transitory, tangible, computer-readable medium (i.e., the memory 214) configured to communicate with the controller 212. Furthermore, any number of conventional techniques for electronics configuration, signal processing and/or control, data processing and the like may be employed. Also, the processes, functions, and instructions can include software routines in conjunction with processors, etc.

System program instructions and/or controller instructions may be loaded onto a non-transitory, tangible computer-readable medium having instructions stored thereon that, in response to execution by the processor, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The instructions stored on the memory of the controller 212 may be configured to perform various operations of the adaptable battery management system 110, as described further herein. In various embodiments, the controller 212 may be configured to interrupt the battery system 100 in response to receiving a signal from a sensor (e.g., sensor 216), or where interruption of the battery system 100 is desired. The connect and disconnect function of the solid-state disconnect may achieve both a control and protection function. A connect signal received can be used to enable discharge of the battery system by allowing flow of current. Additionally, a locally or externally observed overcurrent event could be used to trigger disconnect of the battery system in order to minimize the impact of short circuit hazards.

In various embodiments, the controller 212 may be configured to command a pre-charge circuit, disposed in a separate distinct termination module as described further herein, to limit an inrush current without limiting an operating current in response to connecting the battery system (e.g., battery system 100 from FIGS. 2A and 2B) to a load with a capacitive input.

In various embodiments, the sensor 216 may be any sensor known in the art, such as a current sensor, a voltage sensor, or the like. In various embodiments, the sensor 216 is a current sensor. In various embodiments, current sensing may facilitate accurate measurement of charging and discharging current, which may affect a life and functionality of the string of battery modules 101 of the battery system 100 from FIGS. 2A and 2B.

In various embodiments, the termination module 201 further comprises a positive terminal 222 and a negative terminal 224. The positive terminal 222 may be configured to physically, and electrically, couple to an adjacent negative terminal in accordance with the negative terminal 224. The adjacent negative terminal may be an output module as described further herein, an ICMB (e.g., ICBM 20 from FIG. 1A, ICBMs 120 from FIGS. 2A and 2B, or the like), a lead tied directly to an electric motor, or the like. Similarly, the negative terminal 224 may be configured to physically, and electrically, couple to an adjacent positive terminal in accordance with the positive terminal 222. The adjacent positive terminal may be an ICBM (e.g., ICBMs 120 from FIGS. 2A and 2B), an output module as described further herein, or an electric motor. In various embodiments, when the termination module 201 is the first termination module (e.g., a high side termination module), the negative terminal 224 may physically and electrically couple to an adjacent positive terminal (e.g., at electrical interface 150) of an ICBM 120, and the positive terminal 222 may electrically and physically couple to either an output module, or directly to a battery powered component (e.g., an electric motor).

In various embodiments, the termination module 201 further comprises a mechanical connector assembly 240 extending from a first side of the termination module 201 to a second side of the termination module 201. In various embodiments, the mechanical connector assembly 240 comprises the mechanical connections 26 from FIG. 1B disclosed previously herein. The mechanical connector assembly 240 includes a first connector 242 disposed on the first side of the termination module 201 and a second connector 244 disposed on a second side of the termination module. In various embodiments, the positive terminal 222 is also disposed on the first side of the termination module 201 and the negative terminal 224 is also disposed on the second side of the termination module 201. In this regard, the termination module 201 may further facilitate the stackable, extensible, and/or reconfigurable nature of the string of battery modules 101 of battery system 100 from FIGS. 2A and 2B, in accordance with various embodiments.

In various embodiments, the termination module 201 may include a cooling channel 252 defined by a cooling apparatus 250, such as a cooling plate, a pipe, or the like disposed through the termination module 201. The cooling apparatus 250 includes an inlet port 251 and an outlet port 253. The inlet port 251 and outlet port 253 may be configured to be a component within the battery cooling system (e.g., cooling system 130 from FIG. 2A). In various embodiments, the thermal management connections 44 from FIG. 1B include the inlet port 251 and the outlet port 253.

In various embodiments, the battery management connections 42 of the termination module 201 includes a communications interface 262, a communications positive terminal 264, and a communications negative terminal 266. The communications interface 262 may comprise a plurality of pins configured to communicate with various modules (e.g., ICBMs 120 from FIGS. 2A and 2B for battery module telemetry, termination modules 114, 116 from FIGS. 2A and 2B for controller 212 to command the respective termination module 114, 116, etc.). For example, in various embodiments, four pins may be dedicated to ICBM telemetry, which may be communicated via a database distributed throughout each ICBM in the ICBMs 120 from FIGS. 2A and 2B, two pins may be dedicated to a second termination module 114 from FIGS. 2A and 2B (e.g., a low side termination module), and two pins may be dedicated to a third termination module 116 from FIGS. 2A and 2B (e.g., a mid-point termination module) when termination module 201 is the first termination module 112 (e.g., a high side termination module). In various embodiments, when third termination module 116 is a mid-point termination module, the third termination module 116 may be configured to provide a reference voltage for use by the controller 212 in the termination module 201 for power conversion.

Although illustrated as being a separate connector, the communications interface 262 is a daisy chain communication through the ICBMs 120 as illustrated from FIGS. 2A and 2B, in accordance with various embodiments. For example, the communications interface 262 may be an element of the negative terminal 224 and/or the positive terminal 222, in accordance with various embodiments. In various embodiments, when a battery management system only includes a high side and a low side module, the pins dedicated to the mid-point termination module may not be installed, since there would not have to be communication to a mid-point termination module. Although described herein as including eight pins, one skilled in the art would recognize that any number of pins may be utilized for the communication system 140 from FIGS. 2A and 2B and be within the scope of this disclosure. In various embodiments, the communications interface 262 is a distinct interface from the negative terminal 224 and the positive terminal 222. Although illustrated as being on a side surface, the communications interface 262 is not limited in this regard, and may be disposed on a side of the termination module 201 that is adjacent to the negative terminal 224 or the positive terminal 222.

In various embodiments, the termination module 201 further comprises a conductive element 282 extending from the positive terminal 222 to the solid-state disconnect 210. Similarly, the termination module 201 further comprises a conductive element 284 extending from the negative terminal 224 to the solid-state disconnect 210. The conductive elements 282, 284, can comprise any conductive element, such as a wire, a pin, or the like. The present disclosure is not limited in this regard.

In various embodiments, the solid-state disconnect 210 is disposed within the housing 205 and disposed electrically between the positive terminal 222 and the negative terminal 224. In various embodiments, the positive terminal 222 is disposed on a first side 206 of the housing 205 and the negative terminal 224 is disposed on a second side 207 of the housing 205. Similarly, the first connector 242 can be disposed on the first side 206 of the housing 205, and the second connector 244 can be disposed on the second side 207 of the housing 205. In this regard, the termination module 201 can be stackable as described herein. In various embodiments, the first side 206 can be opposite the second side 207. However, the present disclosure is not limited in this regard. For example, the second side 207 could be adjacent to the first side 206 and still be within the scope of this disclosure.

In various embodiments, a communication line 292 extends from the conductive element 282 to the communications positive terminal 264, and a communication line 294 extends from the conductive element 284 to the communications negative terminal 266. The communication line 292 can comprise a fuse 296 disposed thereon and the communication line 294 can comprise a fuse 298 disposed thereon.

Figure 4:
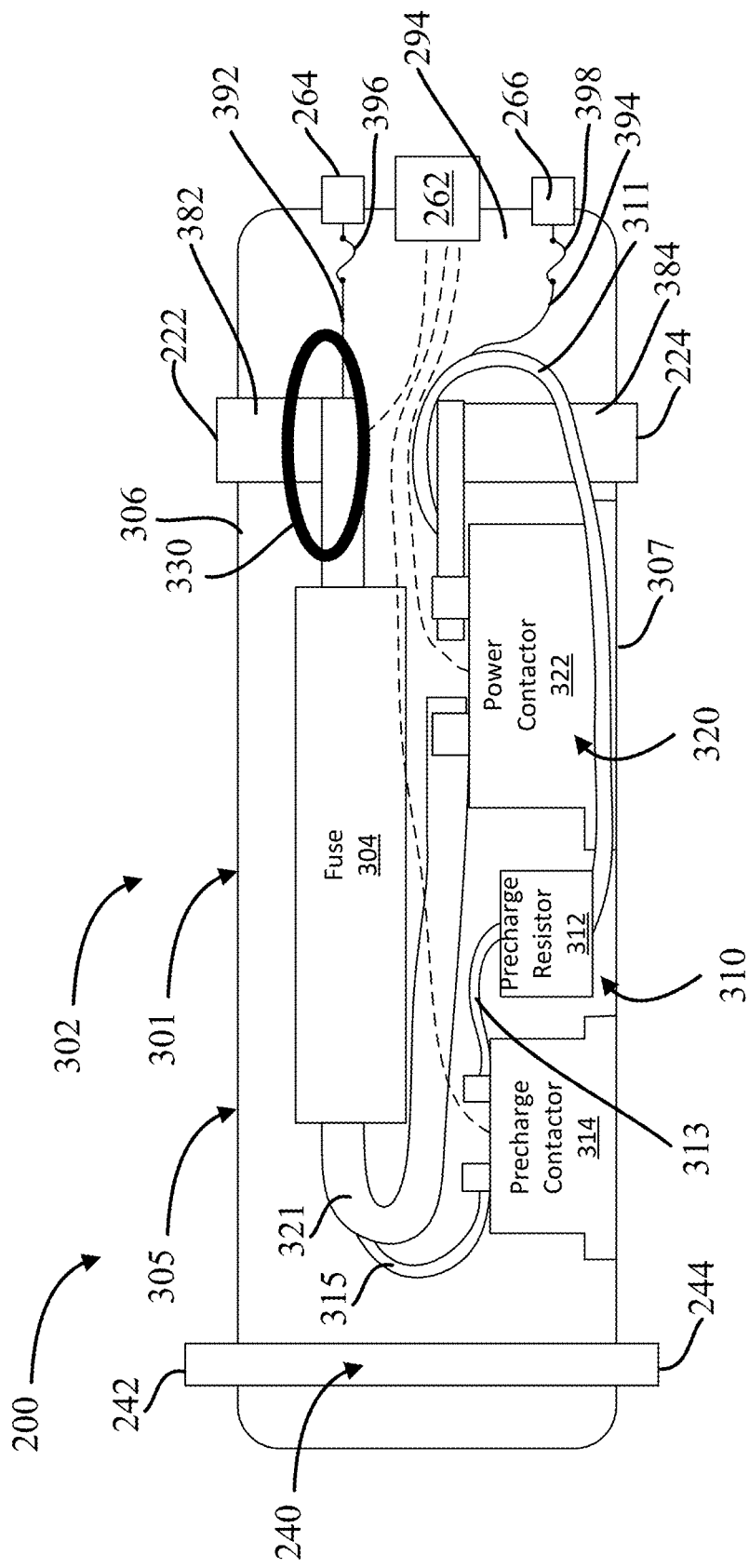
FIG. 4 illustrates a schematic view of a termination module for use in an adaptable battery management system, in accordance with various embodiments.

Referring now to FIG. 4, a termination module 301 of an adaptable battery management system 110 from FIGS. 2A and 2B is illustrated, in accordance with various embodiments. The termination module 301 may be a mechanical termination module in the adaptable battery management system 110. In various embodiments, the termination module 301 may be any of the first termination module 112, the second termination module 114, or the third termination module 116 from FIGS. 2A and 2B. In various embodiments, when the first termination module 112 is termination module 201 from FIG. 3, the termination module 301 may be the second termination module 114 or the third termination module 116 from FIGS. 2A and 2B.

In various embodiments, the termination module 301 comprises a power circuit 302 disposed therein. The power circuit 302 can comprise a pre-charge circuit 310 and a main power circuit 320 disposed within the housing 305.

In various embodiments, the termination module 301 comprises a positive terminal 222, a negative terminal 224, a mechanical connector assembly 240, a communications interface 262, a communications positive terminal 264, a communications negative terminal 266, all of which may be in accordance with the termination module 201 from FIG. 3.

In various embodiments, the termination module 301 may comprise a fuse 304 of the adaptable battery management system 110 from FIGS. 2A and 2B, a pre-charge circuit 310 of the adaptable battery management system 110 from FIGS. 2A and 2B, and/or a main power circuit 320 of the adaptable battery management system 110 from FIGS. 2A and 2B. Although illustrated as being dual purpose with the pre-charge circuit 310 and the main power circuit 320, the termination module 301 is not limited in this regard. For example, the main power circuit 320 and the pre-charge circuit 310 may be in distinct termination modules, in accordance with various embodiments.

In various embodiments, the pre-charge circuit 310 comprises a pre-charge resistor 312 and a pre-charge contactor 314. The pre-charge resistor 312 is in electrical communication with the negative terminal 224 and the pre-charge contactor 314. The pre-charge contactor 314 is in electrical communication with the pre-charge resistor 312 and the fuse 304. In various embodiments, the pre-charge circuit 310 bypasses the power contactor 322 of the main power circuit 320.

In various embodiments, the pre-charge circuit 310 may be controlled by controller 212 of termination module 201 from FIGS. 2A and 2B. In this regard, the control system 200 from the termination module 201 can comprise the pre-charge circuit 310 of the termination module 301 (i.e., the control system 200 can be distributed between multiple termination modules). For example, the pre-charge contactor 314 may be "off" in a default mode, the pre-charge circuit 310 may be commanded, via the controller 212 of termination module 201, to pre-charge a load in response to the battery system 100 from FIGS. 2A and 2B being turned on (i.e., a "pre-charge mode"), and/or the pre-charge circuit 310 may be commanded to remain in an "on" mode after pre-charge, in accordance with various embodiments.

In various embodiments, the main power circuit 320 may comprise the power contactor 322, which may be in electrical communication with the negative terminal 224 and the fuse 304. In various embodiments, the power contactor 322 may be an electrically controllable switch (i.e., controllable by controller 212 from FIG. 3) for switching an electrical power circuit of the battery system 100 from FIGS. 2A and 2B, in accordance with various embodiments.

In various embodiments, the main controller 202 of the control system 200 is configured to receive data from each termination module (e.g., termination modules 112, 114, 116 of adaptable battery management system 110). In this regard, the main controller 202 can perform various functions as described herein based on data received at various locations of the string of battery modules (i.e., low-side, high-side, and/or mid-point), in accordance with various embodiments.

Although the termination module 201 from FIG. 3 (e.g., a high-side termination module) and the termination module 301 from FIG. 4 (e.g., a low-side termination module) are shown as separate distinct termination modules, the functions of the termination module 201 from FIG. 3 and the termination module 301 from FIG. 4 can be combined in a single termination module (e.g., termination module 118 from FIG. 2C). For example, with reference now to FIG. 15, a termination module 1500 (e.g., the termination module 118 from FIG. 2C) is illustrated, in accordance with various embodiments, with like numerals depicting like elements. In this regard, the solid-state disconnect 210, the pre-charge circuit 310, and the main power circuit 320 can be disposed in a housing 1505.

The termination module 1500 can be configured to couple to a high-side of a string of battery modules and a low-side of the string of battery modules as shown in FIG. 2C. In this regard, the adaptable battery management system 111 from FIG. 2C can provide similar adaptability, reconfigurability, and/or stack-ability as the adaptable battery management system 110 from FIGS. 2A and 2B.

In various embodiments, the termination module 301 comprises a housing 305. In various embodiments, the fuse 304, the pre-charge circuit 310, and the main power circuit 320 are disposed within the housing 305. In this regard, in accordance with various embodiments, the fuse 304, the pre-charge circuit 310, and the main power circuit 320 can be disposed in separate, distinct housings (e.g., housing 205 of the termination module 201 disposed at a high-side of a string of battery modules of an adaptable battery management system 110 as shown in FIG. 2A a housing 305 of the termination module 301 disposed at a low-side of the string of battery modules of an adaptable battery management system 110 from FIG. 2A).

In various embodiments, the positive terminal 222 is disposed on a first side 306 of the housing 305 and the negative terminal 224 is disposed on a second side 307 of the housing 305. Similarly, the first connector 242 can be disposed on the first side 306 of the housing 305, and the second connector 244 can be disposed on the second side 307 of the housing 205. In this regard, the termination module 301 can be stackable as described herein. In various embodiments, the first side 306 can be opposite the second side 307. However, the present disclosure is not limited in this regard. For example, the second side 307 could be adjacent to the first side 306 and still be within the scope of this disclosure.

In various embodiments, the termination module 301 further comprises a conductive element 382 extending from the positive terminal 222 to the fuse 304. Similarly, the termination module 301 further comprises a conductive element 384 extending from the negative terminal 224 to the power contactor 322 of the main power circuit 320. The conductive elements 382, 384, can comprise any conductive element, such as a wire, a pin, or the like. The present disclosure is not limited in this regard.

In various embodiments, a communication line 392 extends from the conductive element 382 to the communications positive terminal 264, and a communication line 394 extends from a conductive element 311 of the pre-charge circuit 310 to the communications negative terminal 266. The communication line 392 can comprise a fuse 396 disposed thereon and the communication line 394 can comprise a fuse 398 disposed thereon. In various embodiments, the conductive element 311 extends from the conductive element 384 to the pre-charge resistor 312. Similarly, a conductive element 313 can extend from the pre-charge resistor 312 to the pre-charge contactor 314, and a conductive element 315 can extend from the pre-charge contactor 314 to a conductive element 321 of the main power circuit 320. In various embodiments, the conductive element 321 can extend from the power contactor 322 to the fuse 304.

In various embodiments, the termination module 301 may further comprise sensing equipment configured to provide information to the adaptable battery management system 110 from FIGS. 2A and 2B. For example, the termination module 301 may comprise a current sensor 330 coupled to the conductive element 382. In various embodiments, the main controller 202 of termination module 201 can receive data from the current sensor 330 during operation of the adaptable battery management system 110 from FIGS. 2A and 2B. In various embodiments, the main controller 202 of termination module 201 can receive data from the current sensor 330 during operation of the adaptable battery management system 110 from FIGS. 2A and 2B. Although illustrated as only including a current sensor 330, the present disclosure is not limited in this regard. For example, other sensors could be used instead of, or in addition to, the current sensor 330, such as contactor auxiliary pins, fuse status indicators, temperature sensors, high-voltage interlock loop ("HVIL") sensors, etc.

Figure 5:
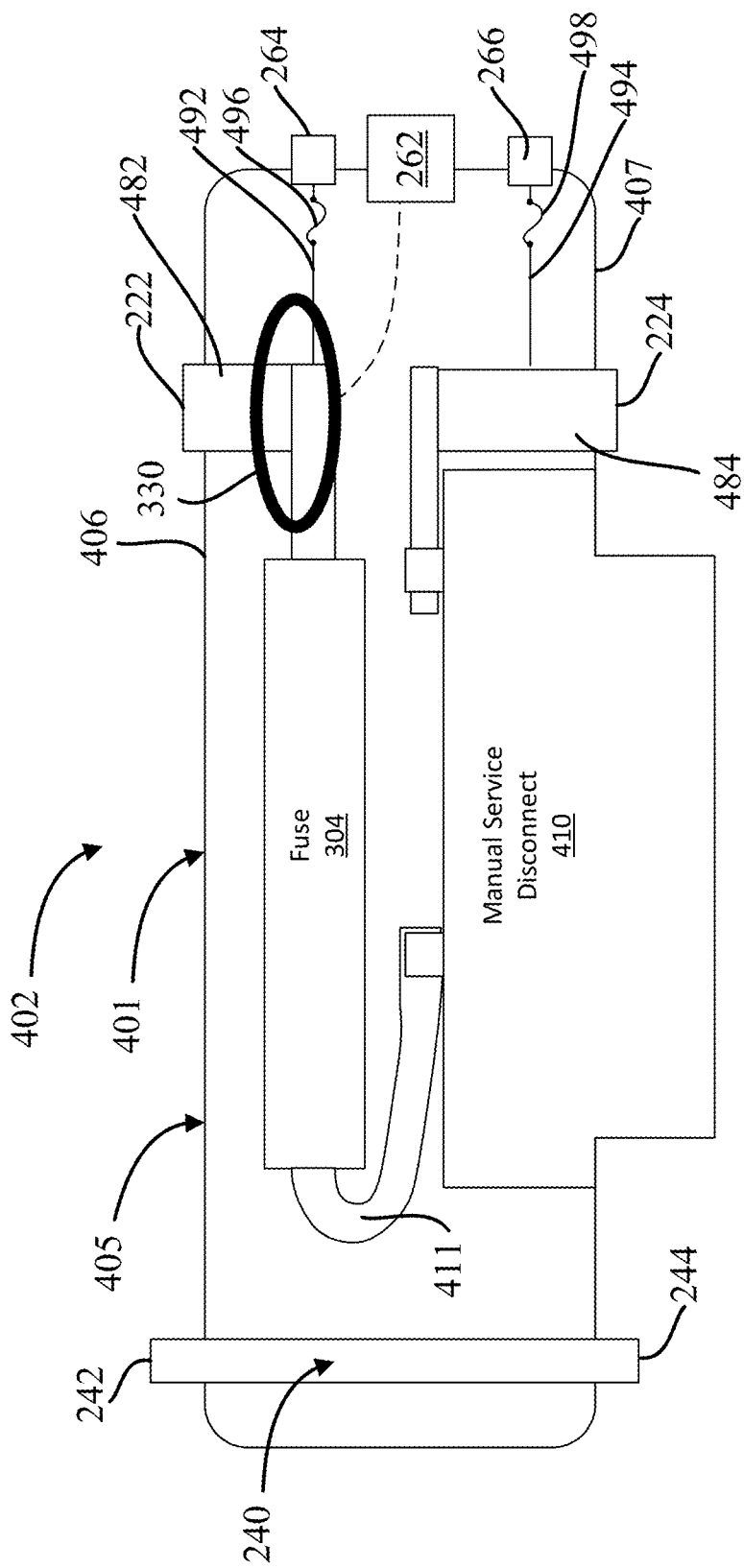
FIG. 5 illustrates a schematic view of a termination module for use in an adaptable battery management system, in accordance with various embodiments.

Referring now to FIG. 5, a termination module 401 (e.g., termination module 116) of an adaptable battery management system 110 from FIGS. 2A and 2B is illustrated, in accordance with various embodiments. The termination module 401 may be a service disconnect termination module in the adaptable battery management system 110. The termination module 401 may comprise a manual service disconnect 410, a fuse 304, a positive terminal 222, a negative terminal 224, a mechanical connector assembly 240, a communications interface 262, a communications positive terminal 264, and a communications negative terminal 266, in accordance with various embodiments. In various embodiments, the termination module 401 may be any of the first termination module 112, the second termination module 114, or the third termination module 116 from FIGS. 2A and 2B. In various embodiments, the termination module 401 may also house sensors (e.g., current sensor 330 from FIG. 4, contactor auxiliary pins, fuse status indicators, temperature sensors, high-voltage interlock loop ("HVIL") sensors, etc.). In various embodiments, the termination module 401 may further comprise the power contactor 322 and/or the pre-charge circuit 310 from FIG. 4. The present disclosure is not limited in this regard.

In various embodiments, when the first termination module 112 is termination module 201 from FIG. 3 and the third termination module 116 is termination module 301 from FIG. 4, the termination module 401 may be the second termination module 114 from FIGS. 2A and 2B. In various embodiments, the termination module 301 from FIG. 4 and the termination module 401 from FIG. 5 may be combined into the second termination module 114. In this regard, the third termination module 116 from FIGS. 2A and 2B may be eliminated, in accordance with various embodiments. For example, the manual service disconnect 410 may be added to termination module 301 from FIG. 4 and the resultant termination module may be a second termination module 114 from FIGS. 2A and 2B in an adaptable battery management system without the third termination module 116 (e.g., a mid-point termination module).

In various embodiments, the termination module 401 comprises a service disconnect circuit 402 disposed therein. The service disconnect circuit 402 can comprise the fuse 304 and the manual service disconnect 410 disposed electrically between the positive terminal 222 and the negative terminal 224 at least partially within the housing 405.

The termination module 401 in FIG. 5 allows for protection of maintenance and overhaul personnel by providing an interface in which overhaul personnel can physically ensure that that the battery maintains an open circuit. By moving the midpoint service disconnect from the midpoint to the third termination module, the service technician may still ensure that the battery system 100 from FIG. 2A has an open circuit. However, by placing it at the endpoint of the string (i.e., as first termination module 112 or second termination module 114 from FIG. 2A) the act of applying this disconnect does not serve to split the voltage of the system. This voltage reduction would be achieved through module disassembly.

In various embodiments, the features of termination modules 201, 301, 401 may be mixed and matched to create a flexible, extensible battery management system (e.g., adaptable battery management system 110 from FIGS. 2A and 2B), in accordance with various embodiments. By utilizing termination modules 201, 301, 401 a central hub for a control system of a string of battery modules (e.g., string of battery modules 101 from FIGS. 2A and 2B) may be eliminated, and/or a wired connection to a central hub may be eliminated, in accordance with various embodiments. In this regard, a stackable, wireless battery management system may be created, resulting in a more robust and/or greater reconfigurability to various systems and applications, in accordance with various embodiments.

In various embodiments, the termination module 401 further comprises a conductive element 482 extending from the positive terminal 222 to the fuse 304. Similarly, the termination module 401 further comprises a conductive element 484 extending from the negative terminal 224 to the manual service disconnect 410. The conductive elements 482, 484 can comprise any conductive element, such as a wire, a pin, or the like. The present disclosure is not limited in this regard.

In various embodiments, the manual service disconnect 410 is disposed at least partially within the housing 405 and disposed electrically between the positive terminal 222 and the negative terminal 224. In various embodiments, the positive terminal 222 is disposed on a first side 406 of the housing 405 and the negative terminal 224 is disposed on a second side 407 of the housing 405. Similarly, the first connector 242 can be disposed on the first side 406 of the housing 405, and the second connector 244 can be disposed on the second side 407 of the housing 405. In this regard, the termination module 401 can be stackable as described herein. In various embodiments, the first side 406 can be opposite the second side 407. However, the present disclosure is not limited in this regard. For example, the second side 407 could be adjacent to the first side 406 and still be within the scope of this disclosure.

In various embodiments, a communication line 492 extends from the conductive element 482 to the communications positive terminal 264, and a communication line 294 extends from the conductive element 484 to the communications negative terminal 266. The communication line 492 can comprise a fuse 496 disposed thereon and the communication line 494 can comprise a fuse 498 disposed thereon.

In various embodiments, at least a portion of the manual service disconnect 410 extends outside the housing 405. In this regard, the manual service disconnect 410 can be accessed for maintenance, or the like, in accordance with various embodiments. In various embodiments, a conductive element 411 (e.g., a conductive wire) extends from the manual service disconnect 410 to the fuse 304.

In various embodiments, the termination module 401 may further comprise sensing equipment configured to provide information to the adaptable battery management system 110 from FIGS. 2A and 2B. For example, the termination module 401 may comprise a current sensor 330 coupled to and in communication with the conductive element 482. Although illustrated as only including a current sensor 330, the present disclosure is not limited in this regard. For example, other sensors could be used instead of, or in addition to, the current sensor 330, such as contactor auxiliary pins, fuse status indicators, temperature sensors, high-voltage interlock loop ("HVIL") sensors, etc.

Figure 6A:
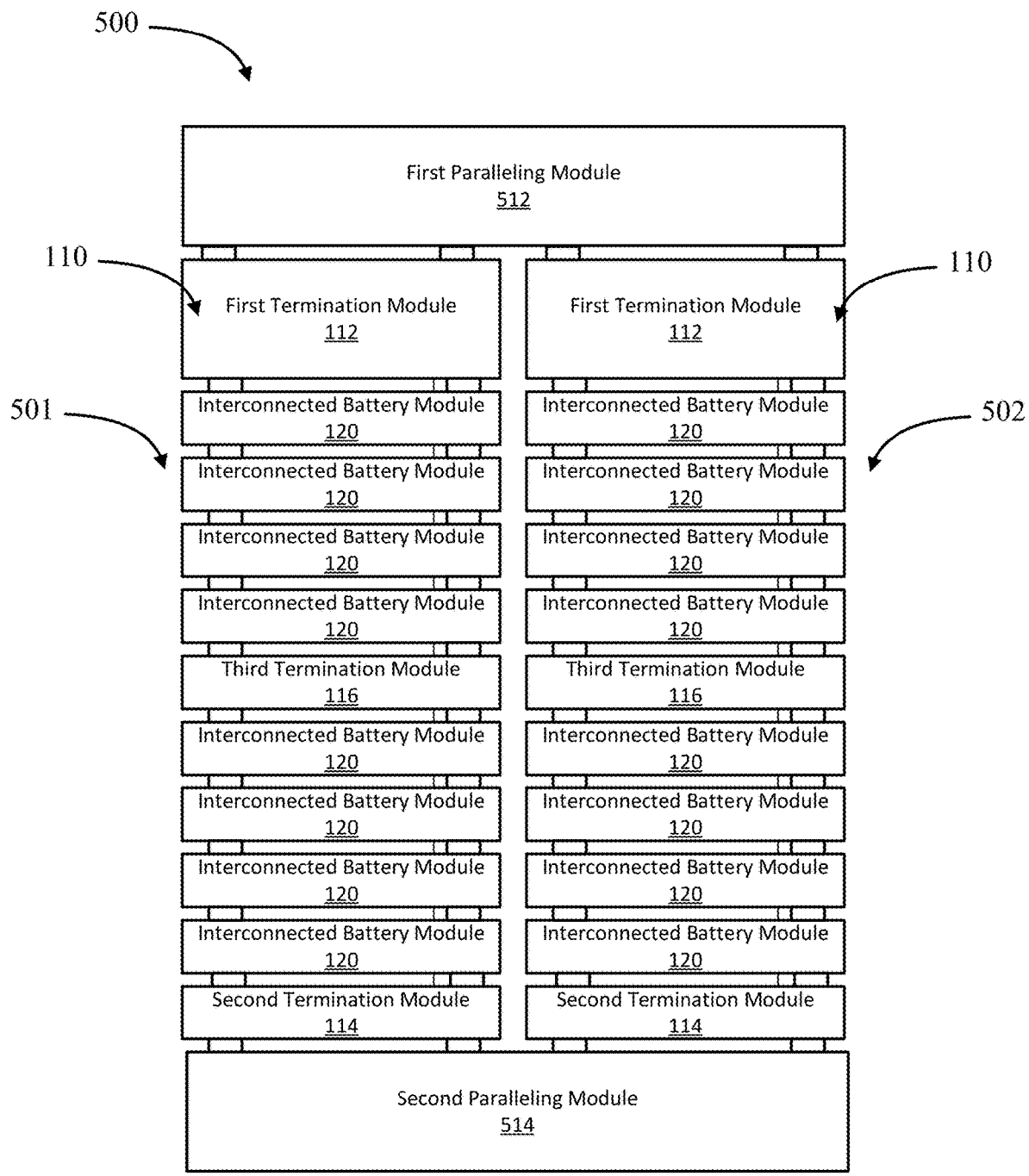
FIG. 6A illustrates a schematic view of a battery system with an adaptable battery management system, in accordance with various embodiments.

Referring now to FIG. 6A, a schematic view of a battery system 500 is illustrated in accordance with various embodiments. The battery system 500 includes a first string of battery modules 501 and a second string of battery modules 502. The string of battery modules 501, 502 may each be in accordance with the string of battery modules 101 from FIGS. 2A and 2B. In this regard, each string of battery modules 501, 502 may include an adaptable battery management system 110, in accordance with various embodiments. In this regard, each string of battery modules 501, 502 of a battery system 500 may be independently monitored and controlled, in accordance with various embodiments.

Although illustrated as including two strings of battery modules 501, 502, any number of strings of battery modules is within the scope of this disclosure. For example, any number of strings of battery modules may be connected electrically in parallel to increase a voltage of a battery system 500, in accordance with various embodiments.

The battery system 500 comprises a first paralleling module 512 and a second paralleling module 514. The first paralleling module 512 may be configured to electrically couple to a positive terminal of the first string of battery modules 501 and a positive terminal of the second string of battery modules 502, and the second paralleling module 514 may be configured to electrically couple to a negative terminal of the first string of battery modules 501 and a negative terminal of the second string of battery module 502. The electrical connections between a string of battery modules 501, 502 and a paralleling module 512, 514 may be in accordance with the plurality of electrical interfaces 150 from FIG. 2A, in accordance with various embodiments. In this regard, each module in battery system 500 may comprise a common electrical interface (e.g., a positive terminal configured to couple to a negative terminal of an adjacent module in the same manner as any other module) and be configured to couple to any other module in battery system 500. In this regard, the extensible and/or stackable nature of the battery system may further be facilitated.

Figure 6B:
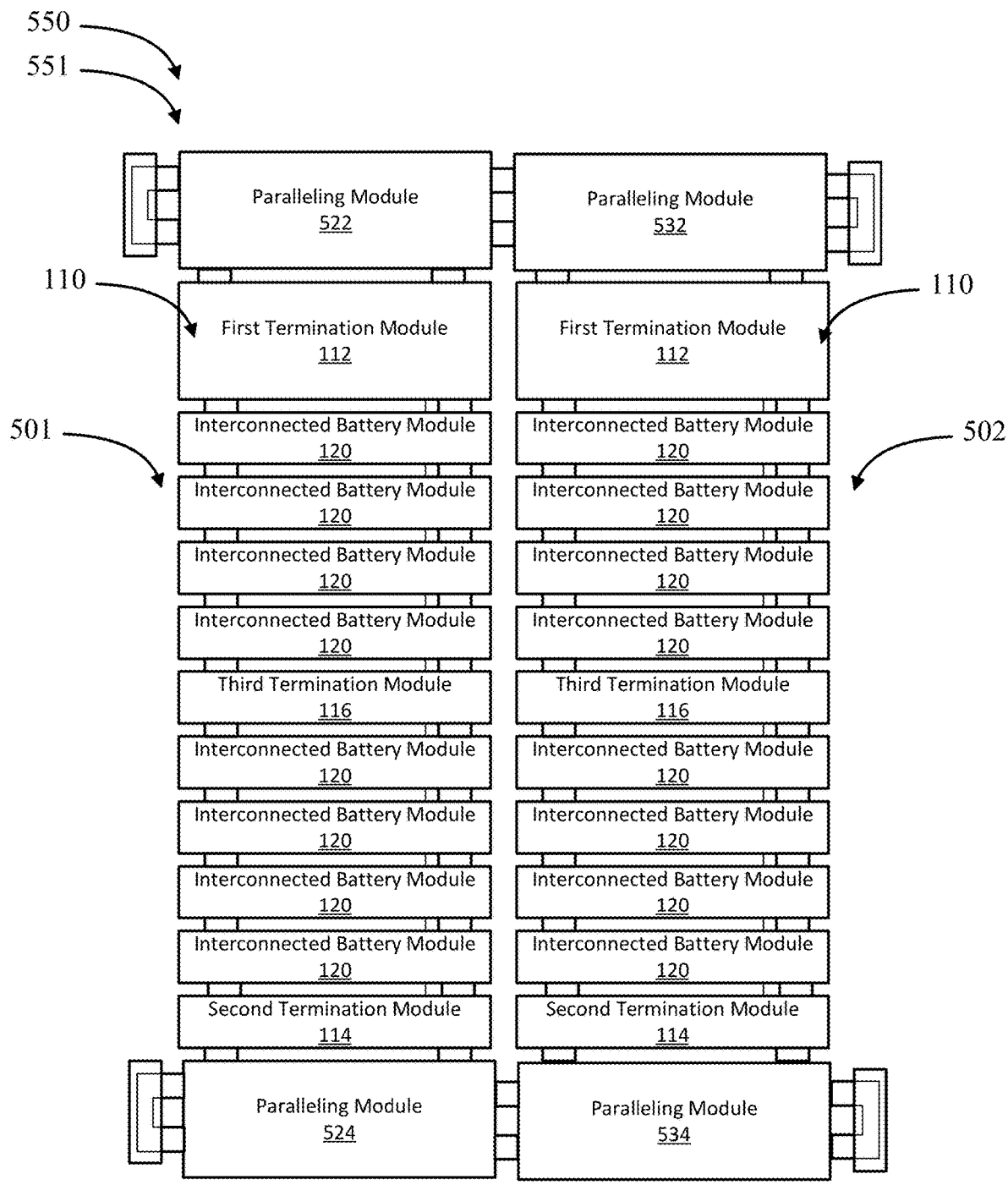
FIG. 6B illustrates a schematic view of another battery system with an adaptable battery management system, in accordance with various embodiments.

Referring now to FIG. 6B, a schematic view of a battery system 550 with reconfigurable paralleling modules 522, 524, 532, 534 is illustrated, in accordance with various embodiments. In various embodiments, the paralleling modules 522, 524, 532, 534 may extend a string of battery modules to include the paralleling module. In this regard, additional strings of battery modules may be added without modifying a respective paralleling module, in accordance with various embodiments. Once a number of strings of battery modules is determined each end may be capped, closing the circuit defined by the electrically coupled paralleling modules. In various embodiments, paralleling modules in accordance with battery system 550 may provide additional flexibility and adaptability to a battery management system 551 as further described in FIG. 7, in accordance with various embodiments.

Figure 7:
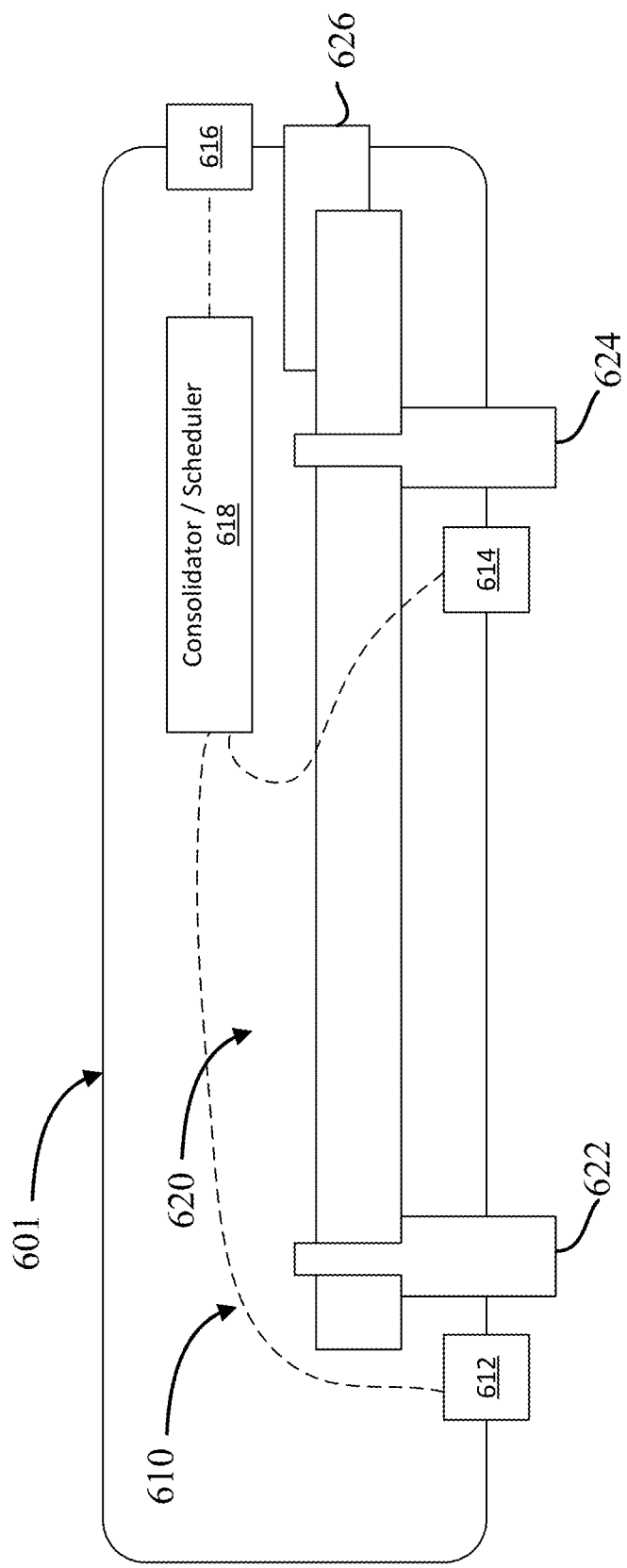
FIG. 7 illustrates a schematic view of a paralleling module of a battery system with an adaptable battery management system, in accordance with various embodiments.

Referring now to FIG. 7, a schematic view of a paralleling module 601 for use in a battery system 100, 500, in accordance with various embodiments, is illustrated. Although the paralleling module 601 is illustrated as in accordance with first paralleling module 512 from FIG. 6A, the components of the paralleling module 601 may be utilized for second paralleling module 514 from FIG. 6A as well, in accordance with various embodiments. In various embodiments, the paralleling module 601 may include a common module that can be used to parallel any number of modules without a special design for each module to be paralleled, which may result in economies of scale and greater simplicity for a battery system 100, 500, in accordance with various embodiments.

In various embodiments, the paralleling module 601 includes a communications system 610 and an electrical connection system 620. The communications system 610 includes string communications interfaces 612, 614 and a platform communications interface 616. The string communications interfaces 612, 614 are in electrical communication with the platform communications interface 616. The string communications interfaces 612, 614 are configured to couple to an adjacent string of battery modules (e.g., string of battery modules 501, 502 from FIG. 6A or 6B). In this regard, the string communications interfaces 612, 614 may couple to a first termination module 112 from FIGS. 2A and 2B of a respective string of battery modules (e.g., string of battery modules 101 from FIGS. 2A and 2B) and facilitate communications of various termination modules (e.g., termination modules 112, 114, 116) to a respective platform through the platform communications interface 616. In this regard, the platform communications interface 616 is configured to couple to a platform for a respective application (e.g., a main controller for an electric motor).

In various embodiments, the paralleling module 601 may further comprise a consolidator/scheduler 618. The consolidator/scheduler 618 may be configured to consolidate the communications from the various string of battery modules (e.g., string of battery modules 501, 502 from FIG. 6A. The consolidator/scheduler 618 may be configured for multiple roles. First, the consolidator/scheduler 618 may send and receive data from each independent battery string and provide a single data interface to the vehicle for the battery system 100 from FIG. 2A-C. Second, the consolidator/scheduler 618 may protect the system against string-to-string voltage imbalance, in accordance with various embodiments. In this regard, the consolidator/scheduler 618 may be in electrical communication with main controller 202 of control system 200 from FIG. 3 and a vehicle control system to consolidate data between strings of batteries as shown in FIG. 6B.

In various embodiments, the electrical connection system includes string terminals 622, 624 and a platform terminal 626. The string communications interfaces 612, 614 are in electrical communication with the platform terminal 626. The string terminals 622, 624 are configured to couple to an adjacent string of battery modules (e.g., string of battery modules 501, 502 from FIG. 6A or 6B). In this regard, the string terminals 622, 624 may couple to a first termination module 112 from FIGS. 2A and 2B of a respective string of battery modules (e.g., string of battery modules 101 from FIGS. 2A and 2B) and electrically couple the string of battery modules (e.g., string of battery modules 501, 502) in parallel to a respective platform through the platform terminal 626. In this regard, the platform terminal 626 is configured to couple to interface with a terminal for a platform for a respective application (e.g., an electric motor) and power the respective application.

Although illustrated as including a communications system 610 configured to relay the communications of various strings of battery modules (e.g., string of battery modules 501, 502 from FIG. 6A or 6B), the paralleling module 601 is not limited in this regard. For example, the communications for each string of battery modules (e.g., string of battery modules 501, 502) may remain local, in accordance with various embodiments.

Figure 8:
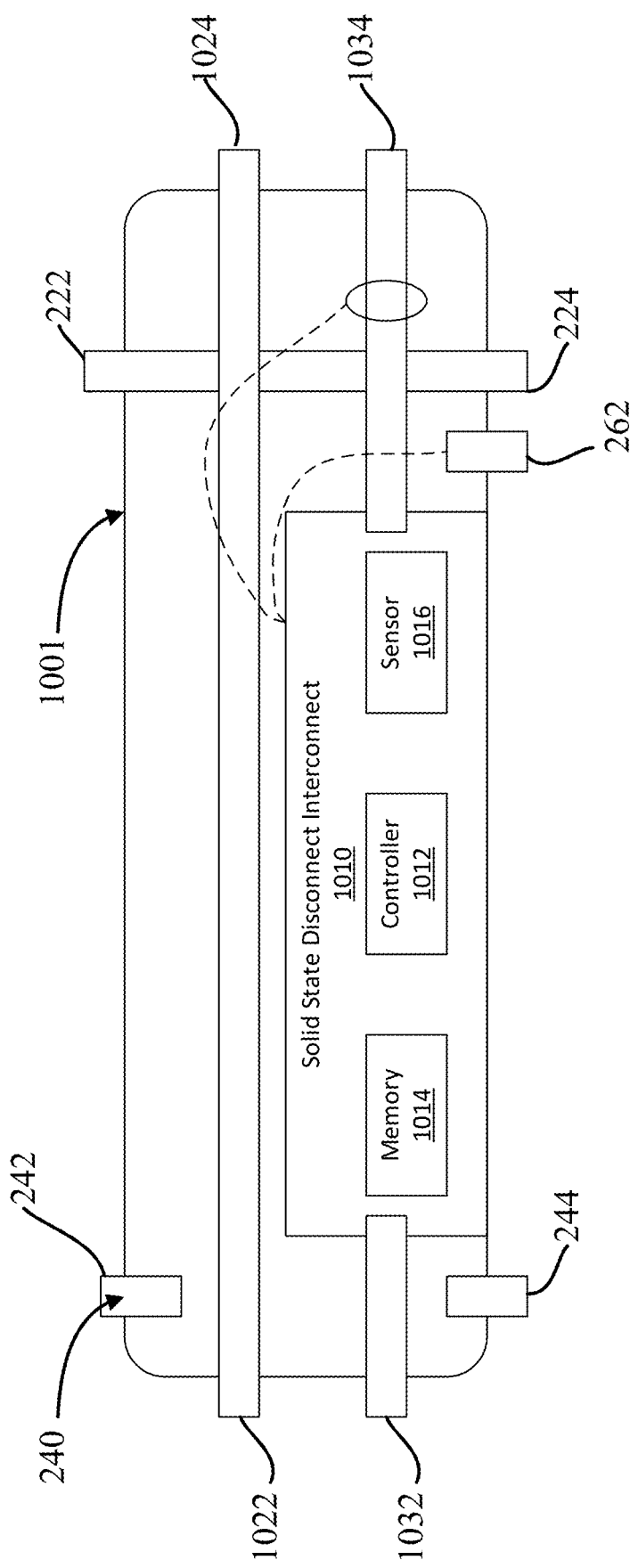
FIG. 8 illustrates a paralleling module of a battery system with an adaptable battery management system, in accordance with various embodiments.

Referring now to FIG. 8, a schematic view of a paralleling module 1001 is illustrated, in accordance with various embodiments. In various embodiments, the paralleling modules 522, 524, 532, 534 from FIG. 6B may be in accordance with paralleling module 1001. In this regard, paralleling modules 522, 524, 532, 534 may be configured for reconfigurability via a solid-state disconnect interconnect 1010. The solid-state disconnect interconnect 1010 may be in accordance with the solid-state disconnect 210 from FIG. 3. For example, the solid-state disconnect interconnect 1010 may include a controller 1012, a memory 1014, and a sensor 1016 (e.g., a current sensor).

In various embodiments, the paralleling module 1001 includes a positive terminal 222, a negative terminal 224, and a mechanical connector assembly 240 with first connector 242 and second connector 244. In this regard, paralleling module 1001 may be stackable with the plurality of battery modules from FIGS. 2A and 2B (e.g., termination modules 112, 114, 116 and ICBMs 120). In various embodiments, the paralleling module 1001 may include paralleling interfaces 1022, 1024, 1032, 1034 configured to interface with an adjacent paralleling module (e.g., a paralleling module also in accordance with paralleling module 1001).

In various embodiments, solid-state disconnect interconnect 1010 may receive instructions from a main controller of a battery system (e.g., battery system 550 from FIG. 6B) to reconfigure a current flow through the paralleling module 1001. In this regard, in response to receiving instructions from the main controller, the solid-state disconnect interconnect 1010 may instruct, via controller 1012, to switch electrical communication to paralleling interface 1034 off, and/or re-route a respective current flow through the paralleling module 1001.

Figure 9:
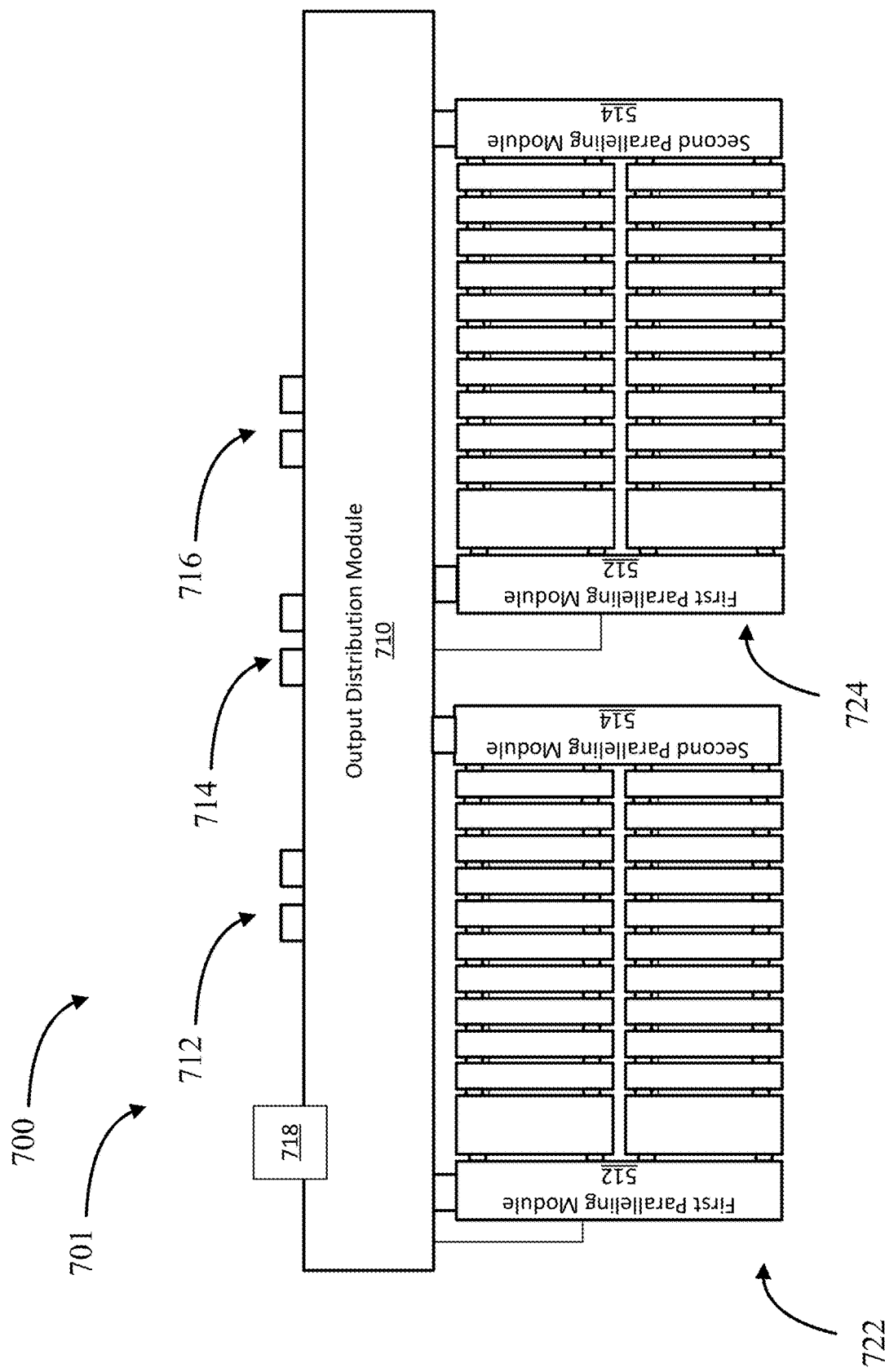
FIG. 9 illustrates a schematic view of a battery system with an adaptable battery management system, in accordance with various embodiments.
Figure 10:
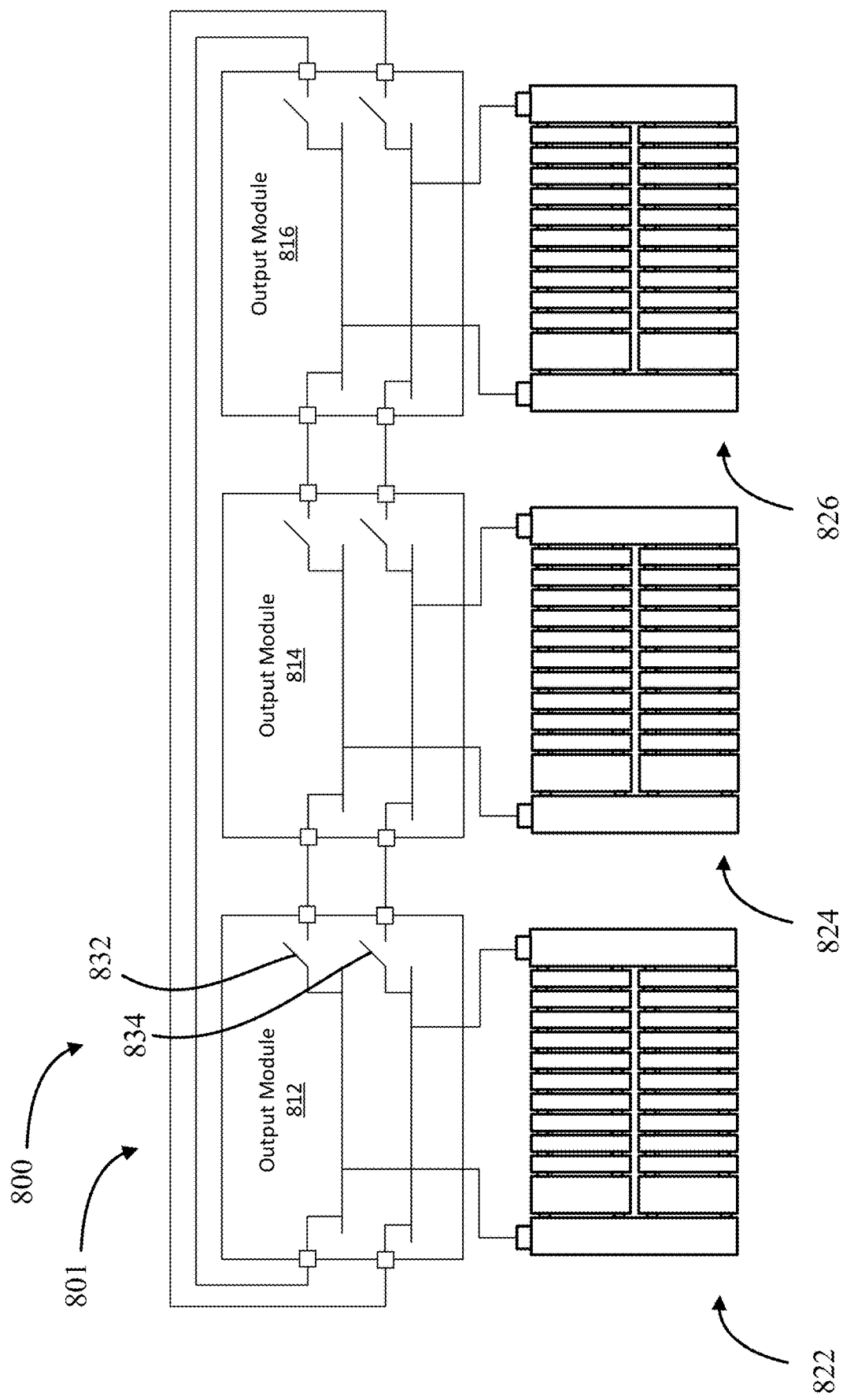
FIG. 10 illustrates a schematic view of another battery system with an adaptable battery management system, in accordance with various embodiments.
Figure 11:
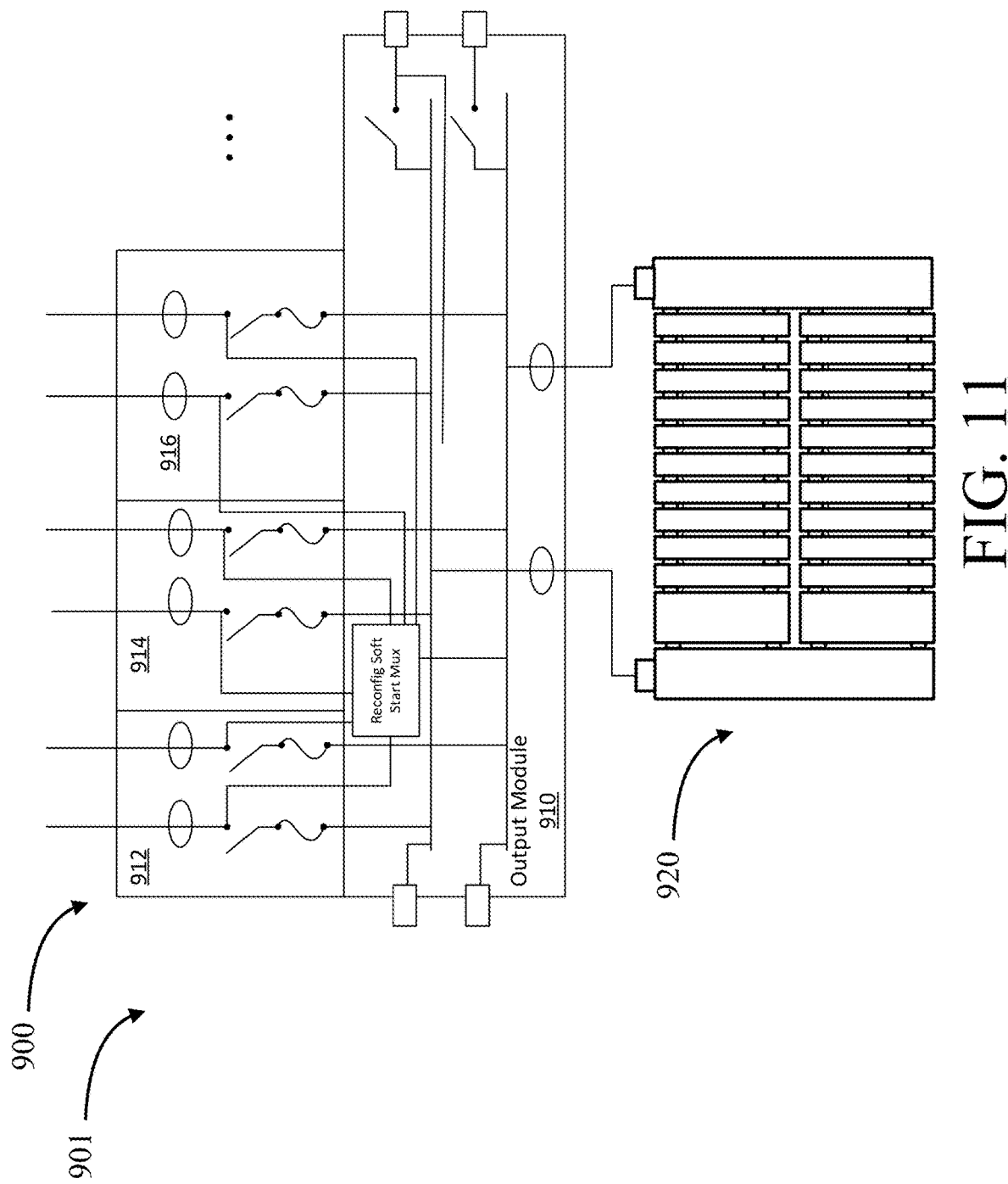
FIG. 11 illustrates a schematic view of yet another battery system with an adaptable battery management system, in accordance with various embodiments.

Referring now to FIGS. 9-11, schematic views of various battery systems 700, 800, 900 with an adaptable battery management system 701, 801, 901 are illustrated, in accordance with various embodiments. Battery system 700, 800, 900 illustrate that the adaptable battery management systems disclosed herein may be reconfigurable and adaptable to various end-use applications without changing the termination modules (e.g., termination modules 112, 114, 116 from FIGS. 2A and 2B) or the ICBMs 120 from FIGS. 2A and 2B, or the paralleling modules 512, 514 from FIG. 6A. In this regard, various battery systems with various functions may be created based on reconfiguring the modules disclosed herein. In various embodiments, the output modules illustrated in FIGS. 9-11 may be applied to different types of battery systems (e.g., with or without parallel modules), in accordance with various embodiments of termination modules.

In various embodiments, with reference now to FIG. 9, the battery system 700 comprises an output distribution module 710, a first set of paralleled strings of battery modules 722 and a second set of paralleled strings of battery modules 724. Any number of sets of paralleled strings of battery modules 722, 724 is within the scope of this disclosure. A positive terminal (e.g., an electrical interface of the first paralleling module 512 of the sets of paralleled strings of battery modules 722, 724) and a negative terminal (e.g., an electrical interface of the second paralleling module 514 of the sets of paralleled strings of battery modules 722, 724) may be electrically coupled to the output distribution module 710 by any method known in the art. In this regard, the first set of paralleled strings of battery modules 722 may be electrically coupled in series or in parallel to the second set of parallel strings of battery modules 724 via the output distribution module 710.

In various embodiments, the output distribution module 710 comprises a first output interface 712. The output distribution module 710 may include only a single output interface or any number of output interfaces (e.g., output interfaces 712, 714, 716). In various embodiments each output interface 712, 714, 716 includes a positive terminal and a negative terminal to couple to a platform or component to be powered electrically. In various embodiments, the adaptable battery management system includes a system level communications system (e.g., communications interface 718 configured to interface with a main controller of a respective platform application). The communication interface 718 may facilitate communications to a main controller to provide inputs for the main controller to provide instructions to each local controller (e.g., controller 212 of termination module 201 from FIG. 3), in accordance with various embodiments.

Referring now to FIG. 10, a schematic view of a battery system 800 with an adaptable battery management system 801 is illustrated, in accordance with various embodiments. The battery system 800 may comprise a ring bus configuration (i.e., a plurality of circuit breakers connected to form a ring), with isolators on both sides of the breaker. Circuits may terminate between the breakers and each circuit may be fed from both sides. In this regard, each set of paralleled string of battery modules 822, 824, 826 may correspond with its own respective output module (e.g., a first set of paralleled string of battery modules 822 may be electrically coupled to a first output module 812, a second set of paralleled string of battery modules 824 may be electrically coupled to a second output module 814, and a third set of paralleled string of battery modules 826 may be electrically coupled to a third output module 816. Then, in various embodiments, each output module may be electrically coupled to an adjacent output module to form a ring bus configuration, as illustrated. Each output module 812, 814, 816 may include a positive electrical switch 832 for the positive electrical connection, and a negative electrical switch 834 for the negative electrical connection.

The scheme illustrated in FIG. 10 may have good operation flexibility and high reliability. Any of the circuit breakers can be opened and isolated for maintenance without interruption of service, in accordance with various embodiments.

Referring now to FIG. 11, a schematic view of a battery system 900 with an adaptable battery management system 901 is illustrated in accordance with various embodiments. The adaptable battery management system 901 comprises an output module 910 having various output circuits 912, 914, 916. Any number of output circuits is within the scope of this disclosure. Additionally, the output module 910 may comprise various disconnects to isolate any of the circuits 912, 914, 916, or to disconnect the output power module 910 from the set of paralleled string of battery modules 920. The battery system 900 in FIG. 10 is configured to allow for a variable number of output channels from the battery system 900. This allows for adaptability for multiple independent loads which are controlled with an independent pre-charge that is fuse protected. This allows the output module 910 to be relevant to different multi-rotor configurations of aircraft even with a single battery system (e.g., battery system 900).

Figure 12:
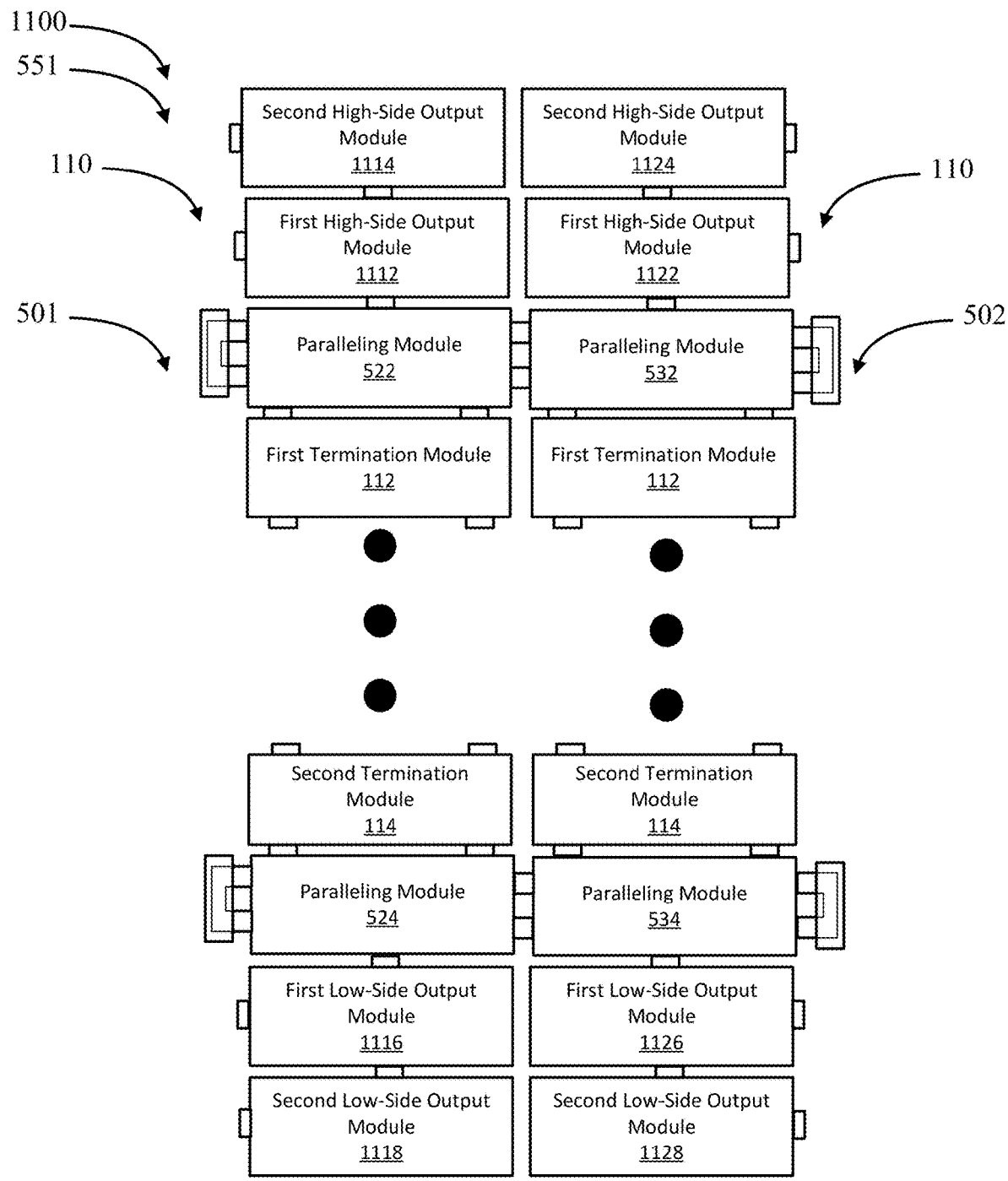
FIG. 12 a schematic view of a battery system with a further adaptable battery management system, in accordance with various embodiments.

Referring now to FIG. 12, schematic view of a battery system 1100 with multi-output modules is illustrated in accordance with various embodiments. In various embodiments, a battery system with an adaptable battery management system (e.g., adaptable battery management system 110) may further be reconfigurable and/or customizable with output modules for each string of battery modules (e.g., string of battery modules 501, 502). In this regard, output modules may be stacked on top of paralleling modules to create multiple outputs, or a single output from each string of battery modules, from only a single string of battery modules, or any of various combinations, in accordance with various embodiments.

Although illustrated as including two high-side output modules per string of battery modules (e.g., first high-side output modules 1112, 1122 and second high-side output modules 1114, 1124) and two low-side output modules per string of battery modules (e.g., first low-side output modules 1116, 1126 and second low-side output modules 1118, 1128), the present disclosure is not limited in this regard. Any number of output modules may be utilized for a battery system and be within the scope of this disclosure. By further making the output modules stackable in a single string of battery modules (e.g., string of battery modules 501, 502), battery system 1100 may provide further customizability for various applications while being able to maintain consistent output modules between various applications, potentially reducing cost and/or facilitating economies of scale for various battery systems, in accordance with various embodiments.

Figure 13:
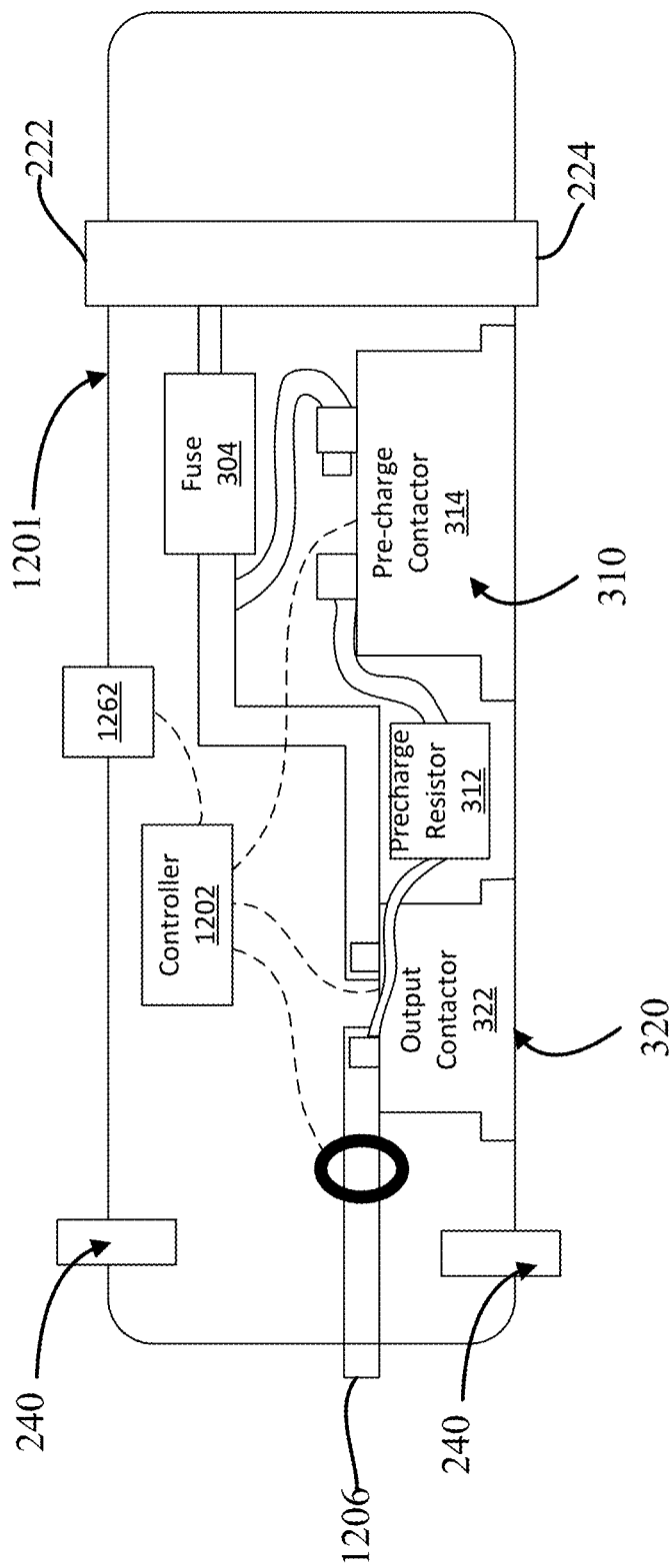
FIG. 13 illustrates an output module for use in a battery system with an adaptable battery management system, in accordance with various embodiments.

Referring now to FIG. 13, a schematic view of an output module 1201 is illustrated in accordance with various embodiments. In various embodiments, any of output modules 1112, 1114, 1122, 1124 may be in accordance with output module 1201. In various embodiments, output module 1201 may include positive terminal 222, negative terminal 224, an output terminal 1206, and a mechanical connector assembly 240. In various embodiments, the output module 1201 may further comprise a fuse 304 of the adaptable battery management system 110 from FIGS. 2A and 2B, a pre-charge circuit 310 of the adaptable battery management system 110 from FIGS. 2A and 2B, and/or a main power circuit 320 of the adaptable battery management system 110 from FIGS. 2A and 2B. Although illustrated as being dual purpose with the pre-charge circuit 310 and the main power circuit 320, the output module 1201 is not limited in this regard. For example, the main power circuit 320 and the pre-charge circuit 310 may be in distinct output modules or termination modules as previously disclosed herein, in accordance with various embodiments.

In various embodiments, the pre-charge circuit 310 comprises a pre-charge resistor 312 and a pre-charge contactor 314. The pre-charge resistor 312 is in electrical communication with the power contactor 322 and the pre-charge contactor 314. The pre-charge contactor 314 is in electrical communication with the pre-charge resistor 312 and the fuse 304. In various embodiments, the pre-charge circuit 310 bypasses the power contactor 322 of the main power circuit 320.

In various embodiments, the pre-charge circuit 310 may be controlled by a local controller 1202 (i.e., an interrupt controller) of output module 1201. For example, the pre-charge contactor 314 may be "off" in a default mode, the pre-charge circuit 310 may be commanded, via the controller 1202 of output module 1201, to pre-charge a load in response to the battery system (e.g., battery system 1100 from FIG. 12) from being turned on (i.e., a "pre-charge mode"), and/or the pre-charge circuit 310 may be commanded to remain in an "on" mode after pre-charge, in accordance with various embodiments.

In various embodiments, the main power circuit 320 may comprise the power contactor 322, which may be in electrical communication with the negative terminal 224 through the fuse 304. In various embodiments, the power contactor 322 may be an electrically controllable switch (i.e., controllable by controller 1202) for switching an electrical power circuit of the battery system 1100 from FIG. 12, in accordance with various embodiments.

In various embodiments, the output module 1201 may further comprise a communications interface 1262 in electrical and/or operable communication with the controller 1202. In this regard, a main controller may be configured to provide instructions to controller 1202 of the output module 1201, in accordance with various embodiments.

With combined reference to FIGS. 11 and 12, the output module 1201 may be disposed at a high side and a low side of each string of battery modules (e.g., string of battery modules 501, 502) with pre-charge only being disposed at one of the two sides. This allows for the easy expansion of outputs to independent loads with full control capability, in accordance with various embodiments.

Figure 14:
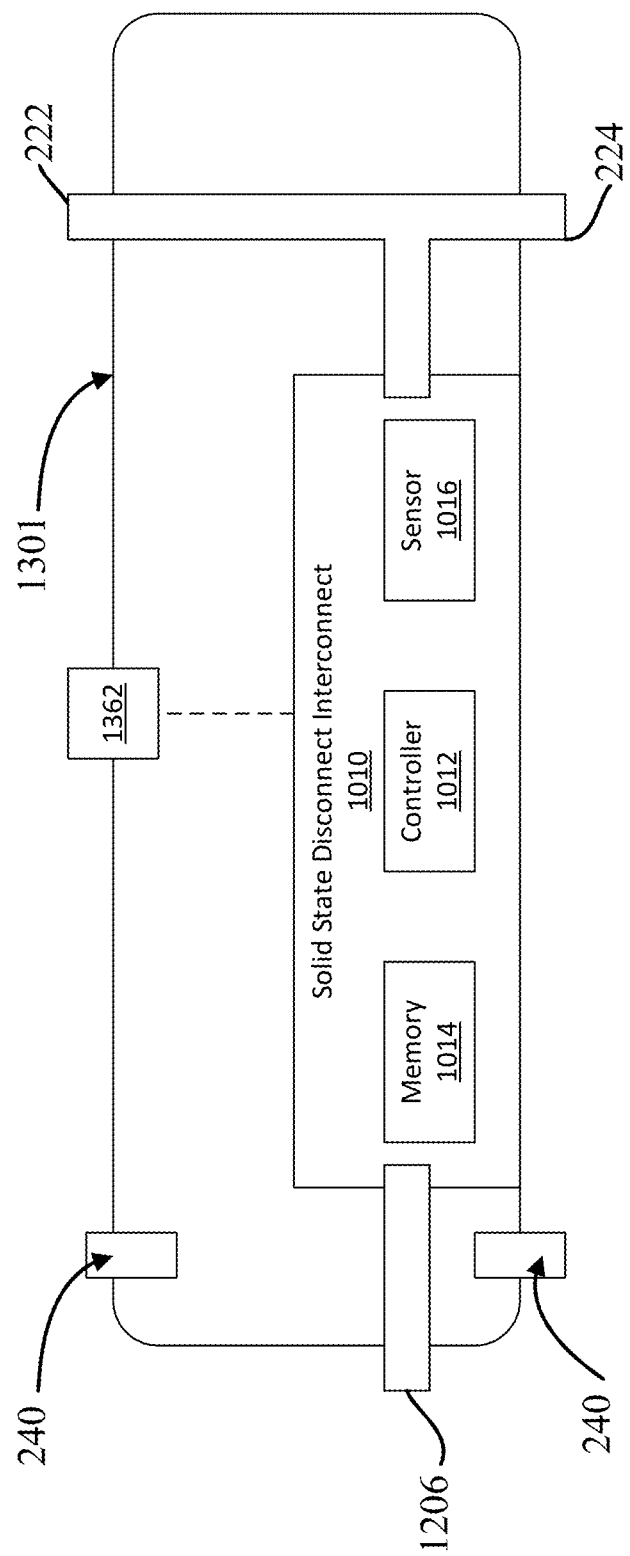
FIG. 14 illustrates another output module for use in a battery system with an adaptable battery management system, in accordance with various embodiments.

Referring now to FIG. 14, a schematic view of an output module 1301 is illustrated, in accordance with various embodiments. In various embodiments, any of output modules 1112, 1114, 1122, 1124 may be in accordance with output module 1301. In various embodiments, output module 1301 may include positive terminal 222, negative terminal 224, an output terminal 1206, and a mechanical connector assembly 240. In various embodiments, the output module 1201 may further comprise a solid-state disconnect interconnect 1010 in electrical communication with the positive terminal 222, the negative terminal 224, and the output terminal 1206. The solid-state disconnect interconnect 1010 may be in electrical and/or operable communication with a communications interface 1362, in accordance with various embodiments. In various embodiments, any combination of output modules 1201, 1301 for a battery system 1100 from FIG. 12 is within the scope of this disclosure. Output modules 1201, 1301 may also provide the function of disconnecting and isolating each independent load from the main battery bus during a failure state, in accordance with various embodiments. Reconnecting a load which has been disconnected can also be accomplished by a local pre-charge function.

Figure 15:
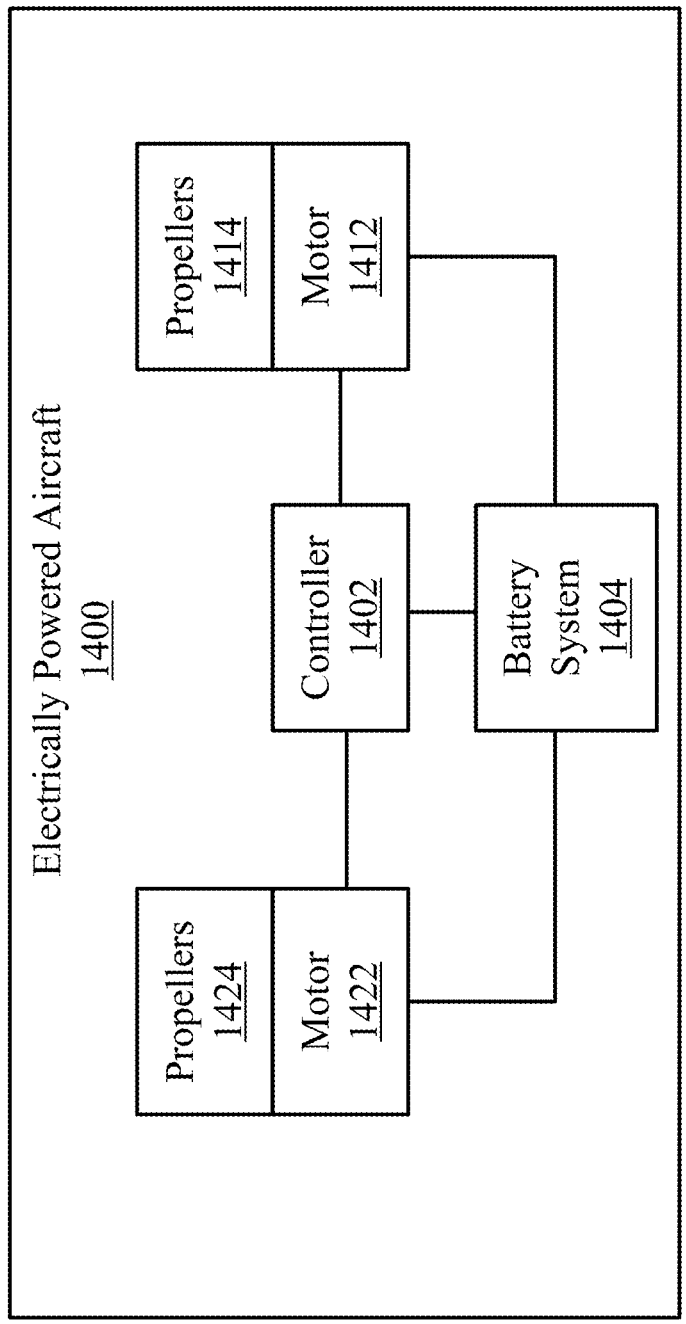
FIG. 15 illustrates a schematic view of an electrically powered aircraft with a battery system, in accordance with various embodiments.

Referring now to FIG. 15, a schematic view of an electrically-powered aircraft 1400 with a battery system 1404 (e.g., battery system 100, battery system 500, battery system 550, battery system 700, battery system 800, battery system 900, or battery system 1100) is illustrated, in accordance with various embodiments. In various embodiments, the electrically powered aircraft 1400 comprises a controller 1402 (e.g., main controller 202 from FIG. 3), motors 1412, 1422, and propellers 1414, 1424. Each motor 1412, 1422 is operably coupled to a respective propeller 1414, 1424. Each motor 1412, 1422 is electrically coupled to the battery system 1404. In this regard, the battery system 1404 is configured to power the motors 1412, 1422 to drive the respective propellers 1414, 1424 and power the electrically powered aircraft 1400, in accordance with various embodiments. In various embodiments, the controller 1402 is configured to command the motors 1412, 1422 to pull power from the battery system 1400 during operation of the electrically powered aircraft 1400. In various embodiments, the controller 1402 is configured to alter a power supply to the motors via the control system 200 described previously herein.

Figure 16:
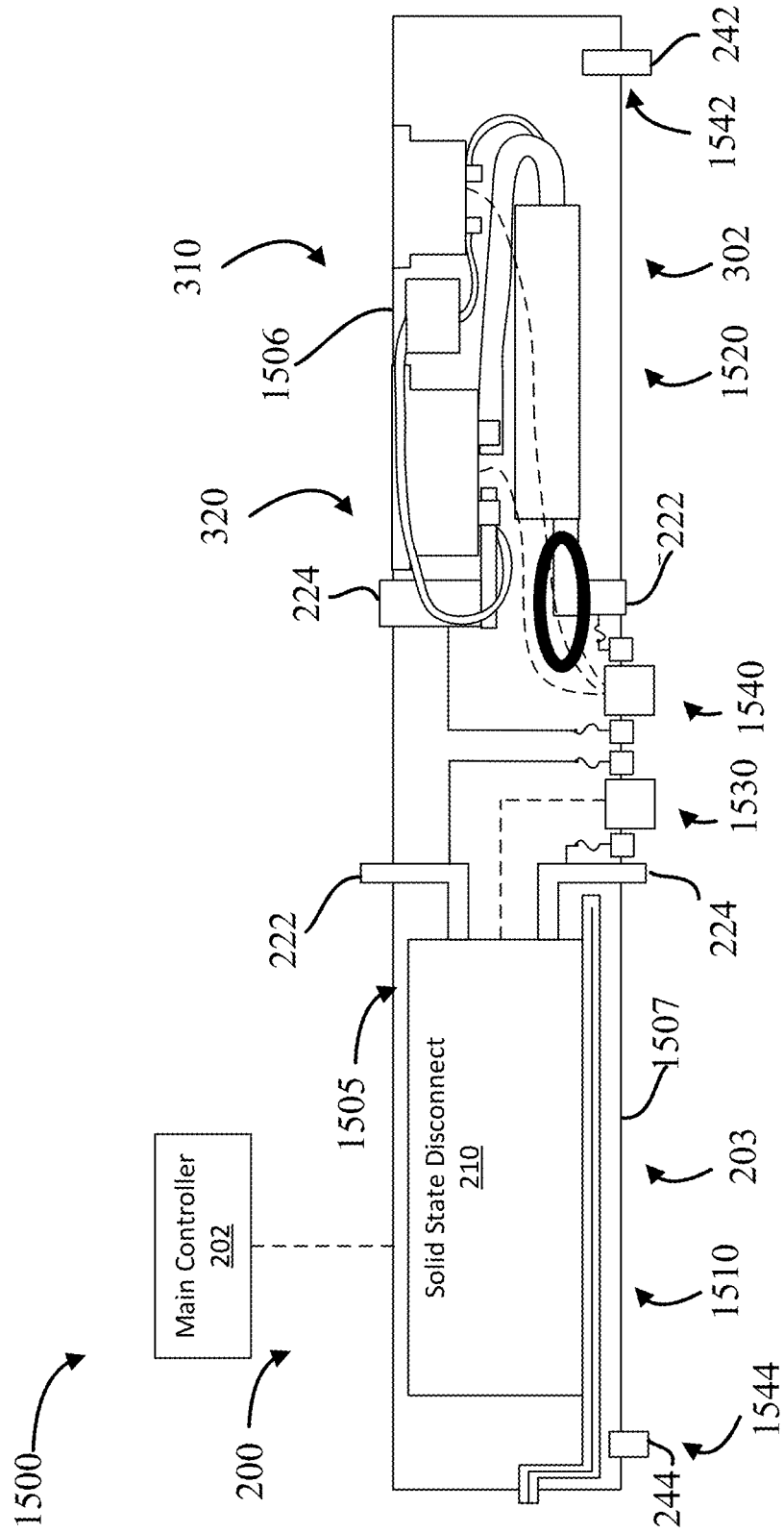
FIG. 16 illustrates a termination module for an adaptable battery management system, in accordance with various embodiments.

Referring now to FIG. 16, the termination module 1500 (e.g., termination module 118 from FIG. 2C) is illustrated, in accordance with various embodiments. As described previously herein, various components from the termination module 201 from FIG. 3 (e.g., termination module 112 from FIG. 2A) and the termination module 301 from FIG. 4 (e.g., termination module 114 from FIG. 2B) can be combined in a single housing (e.g., housing 1505) and a mid-point termination module (e.g., termination module 119 from FIG. 2C) can be disposed opposite the termination module 118 to facilitate the adaptable battery construction of the adaptable battery management system 111 from FIG. 2C. In various embodiments, the termination module 1500 can comprise a high-side functionality of termination module 201 from FIG. 3 and a low-side functionality of termination module 301 from FIG. 4 in a single housing (e.g., housing 1505).

For example, the termination module 1500 can comprise a high-side circuit 1510 (e.g., the solid-state disconnect circuit 203) and a low-side circuit 1520 (e.g., the power circuit 302). Although illustrated as comprising the solid-state disconnect circuit 203 as the high-side circuit 1510 and the power circuit 302 as the low-side circuit 1520, the present disclosure is not limited in this regard. For example, the termination module 1500 can comprise the power circuit 302 as the high-side circuit 1510 or the service disconnect circuit 402 as the high-side circuit 1510 and be within the scope of this disclosure. Similarly, the low-side circuit 1520 of the termination module 1500 can comprise the solid-state disconnect circuit 203 or the service disconnect circuit 402 and be within the scope of this disclosure. In various embodiments, the high-side circuit 1510 and the low-side circuit 1520 are different circuits. Similar, whichever circuit is not in the termination module 1500 can be in a mid-point termination module (e.g., termination module 119 from FIG. 2C), in accordance with various embodiments.

The high-side circuit 1510 can be in accordance with the electrical circuit of termination module 201 from FIG. 3 and the low-side circuit 1520 can be in accordance with the electrical circuit of termination module 301 from FIG. 4. For example, the solid-state disconnect 210 can be disposed electrically between the positive terminal 222 of the high-side circuit 1510 and the negative terminal 224 of the high-side circuit 1510. Similarly, the pre-charge circuit 310 and the main power circuit 320 can be disposed electrically between the positive terminal 222 of the low-side circuit 1520 and the negative terminal 224 of the low-side circuit 1520.

In various embodiments, the positive terminal 222 of the high-side circuit 1510 and the negative terminal 224 of the low-side circuit can both be on a first side 1506 of the housing 1505. Similarly, the negative terminal 224 of the high-side circuit 1510 and the positive terminal 222 of the low-side circuit 1520 can be disposed on a second side 1507 of the housing 1505. In various embodiments, the termination module 1500 can further comprise a first connector assembly 1542 and a second connector assembly 1544. The first connector assembly 1542 can comprise the first connector 242 and the second connector assembly 1544 can comprise the second connector 244. The first connector 242 can be disposed on the second side 1507 of the housing 1505 on a first longitudinal end (i.e., on a side with the low-side circuit 1520) and the second connector 244 can be disposed on the second side 1507 of the housing 1505 on a second longitudinal end (i.e., on a side with the high-side circuit 1510). In this regard, the termination module 1500 can further facilitate stack-ability as described previously herein (e.g., a first ICBM can be coupled to the positive terminal 222 of the low-side circuit 1520 and a second ICBM can be coupled to the negative terminal 224 of the high-side circuit 1510 as shown in the adaptable battery management system 111 from FIG. 2C). Stated another way, a first ICBM (e.g., ICBM 20 from FIG. 1A) can be coupled to the first connector 242 and the positive terminal 222, and a second ICBM (e.g., ICBM 20 from FIG. 1A) can be coupled to the negative terminal 224 and the second connector 244 in a manner described previously herein.

In various embodiments, the termination module 1500 can further comprise a communication interface for each circuit. For example, the high-side circuit 1510 can comprise a communication interface 1530 (e.g., having communications interface 262, communications positive terminal 264, and communications negative terminal 266 disclosed previously herein). Similarly, the low-side circuit 1520 can comprise a communications interface 1540 (e.g., having communications interface 262, communications positive terminal 264, and communications negative terminal 266 disclosed previously herein). In this regard, separate communications can be relayed to various controllers (e.g., a power distribution controller for an electrically powered aircraft 1400 from FIG. 15), in accordance with various embodiments.

Figure 17:
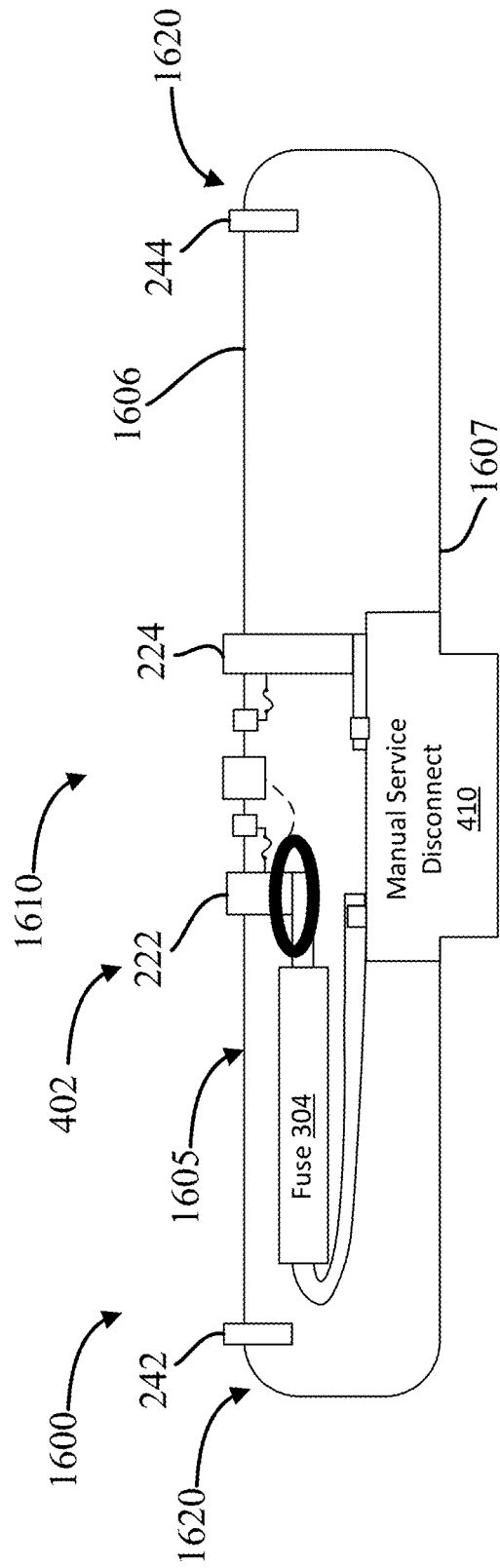
FIG. 17 illustrates a termination module for an adaptable battery management system, in accordance with various embodiments.

Referring now to FIG. 17, a termination module (e.g., termination module 119 from FIG. 2C) is illustrated, in accordance with various embodiments. In various embodiments, the termination module 1600 comprises a mid-point electrical circuit 1610. In various embodiments, the mid-point electrical circuit 1610 comprises the service disconnect circuit 402 of the termination module 401 from FIG. 5. Although illustrated as including the service disconnect circuit 402, the present disclosure is not limited in this regard. For example, the mid-point electrical circuit 1610 could comprise the solid-state disconnect circuit 203 or the power circuit 302 and still be within the scope of this disclosure.

In various embodiments, the termination module 1600 comprises a housing 1605 with the mid-point electrical circuit disposed therein. In various embodiments, the positive terminal 222 and the negative terminal 224 of the mid-point electrical circuit 1610 can be disposed on a first side 1606 of the housing 1605. Similarly, a first connector 242 and a second connector 244 of a connector assembly 1620 for the termination module 1600 can be disposed on the first side 1606 of the housing. In this regard, a first ICBM (e.g., ICBM 20 from FIG. 1A) can be coupled to the first connector 242 and the positive terminal 222 of the termination module 1600, and a second ICBM (e.g., ICBM 20 from FIG. 1A) can be coupled to the negative terminal 224 and the second connector 244. In this regard, a series of ICBM modules can be extended through the termination module 1600 (e.g., as shown in FIG. 2C with termination module 119), in accordance with various embodiments.

In various embodiments, the manual service disconnect 410 is disposed on a second side 1607 of the housing 1605. The manual service disconnect 410 can provide an easy access point for maintenance or the like, in accordance with various embodiments.

Disclosed herein is an adaptable battery management system. In various embodiments, the adaptable battery management system comprises: a high side termination module configured to mechanically and electrically couple to a first interconnected battery module, the high side termination module including a high side positive terminal and a high side negative terminal, the high side negative terminal configured to electrically couple to a first positive terminal of the first interconnected battery module; a low side termination module configured to mechanically and electrically couple to a second interconnected battery module, the low side termination module including a low side positive terminal and a low side negative terminal, the low side positive terminal configured to electrically couple to a second negative terminal of the second interconnected battery module that is electrically connected to the first interconnected battery module; a main controller disposed in one of the high side termination module or the low side termination module; and a fuse plug disposed in the high side termination module or the low side termination module, the fuse plug disposed in a different termination module from the main controller.

In various embodiments, the adaptable battery management system further comprises a plurality of interconnected battery modules disposed between the high side termination module and the low side termination module. The high side termination module, the low side termination module, and the plurality of interconnected battery modules can be in electrical communication. In various embodiments, a plurality of electrical interfaces between the high side termination module and the first interconnected battery module in the plurality of interconnected battery modules, the low side termination module and the second interconnected battery module in the plurality of interconnected battery modules, and adjacent interconnected battery modules in the plurality of interconnected battery modules, wherein each electrical interface in the plurality of electrical interfaces are similar. In various embodiments, the adaptable battery management system further comprises a mid-point termination module configured to be disposed between a first set of interconnected battery modules in the plurality of interconnected battery modules and a second set of interconnected battery modules in the plurality of interconnected battery modules, wherein, the first set of interconnected battery modules are configured to be disposed between the high side termination module and the mid-point termination module, and the second set of interconnected battery modules are configured to be disposed between the low side termination module and the mid-point termination module. In various embodiments, the mid-point termination module is configured to provide a reference voltage to the main controller for power conversion. In various embodiments, the mid-point termination module includes a service disconnect.

In various embodiments, the high side termination module and the low side termination module are adaptable for a first battery system with a first number of battery modules and a second battery system with a second number of battery modules, the second number of battery modules being different from the first number of battery modules. A first position of a mid-point termination module in the first battery system can be adaptable to any position within a series of battery modules between the high side termination module and the low side termination module. A second position of the mid-point termination module in the second battery system can be adaptable to any position within a second series of battery modules between the high side termination module and the low side termination module.

A battery system is disclosed herein. In various embodiments, the battery system can comprise: a plurality of interconnected battery modules, each interconnected battery module in the plurality of interconnected battery modules physically and electrically coupled to an adjacent interconnected battery module in the plurality of interconnected battery modules; and a battery management system having a control system configured to manage, protect, and control the battery system, the battery management system comprising: a first termination module disposed at a first end of the plurality of interconnected battery modules, the first termination module including a first portion of the control system of the battery system; and a second termination module disposed at a second end of the plurality of interconnected battery modules, the second termination module including a second portion of the control system of the battery system.

In various embodiments, the plurality of interconnected battery modules are electrically coupled without wiring. The battery system can further comprise a plurality of electrical interfaces between the first termination module and a first interconnected battery module in the plurality of interconnected battery modules, the second termination module and a second interconnected battery module in the plurality of interconnected battery modules, and adjacent interconnected battery modules in the plurality of interconnected battery modules, wherein each electrical interface in the plurality of electrical interfaces are similar. The battery system can further comprise a third termination module, wherein: a first set of interconnected battery modules in the plurality of interconnected battery modules are disposed between the first termination module and the third termination module, and a second set of interconnected battery modules in the plurality of interconnected battery modules are disposed between the second termination module and the third termination module.

An adaptable battery management system is disclosed herein. In various embodiments, the adaptable battery management system comprises: a first string of battery modules: a second string of battery modules, the first string of battery modules and the second string of battery modules each comprising: a high side termination module including a first portion of a control system for the respective string of battery modules: a low side termination module including a second portion of the control system for the respective string of battery modules; a first parallel module configured to electrically couple each positive terminal in the high side termination module of the first string of battery modules and the second string of battery modules together; and a second parallel module configured to electrically couple each negative terminal in the low side termination module of the first string of battery modules and the second string of battery modules together.

In various embodiments, the first parallel module includes a first positive terminal, and the second parallel module includes a first negative terminal. The adaptable battery management system can further comprise a distribution module electrically coupled to the first positive terminal, the first negative terminal, a second positive terminal of a third parallel module, and a second negative terminal of a fourth parallel module. The distribution module can further comprise an output positive terminal and an output negative terminal. The distribution module can further comprises a plurality of the output positive terminal and the output negative terminal.

A termination module is disclosed herein. In various embodiments, the termination module can comprise: a housing having a first side and a second side, the second side opposite the first side: a positive electrical terminal disposed on the first side: a negative electrical terminal disposed on the second side; and a first portion of a control system for a battery system disposed within the housing, the control system including a second portion disposed in a second distinct termination module.

In various embodiments, the first portion includes a solid-state disconnect.

In various embodiments, the positive electrical terminal is in accordance with a positive terminal of an interconnected battery module in the battery system; and the negative electrical terminal is in accordance with a negative terminal of the interconnected battery module in the battery system. The termination module can further comprise a first mechanical interface on the first side and a second mechanical interface on the second side.

An adaptable battery management system is disclosed herein. In various embodiments, the adaptable battery management system can comprise: a first termination module configured to mechanically and electrically couple to a first interconnected battery module and a second interconnected battery module, the first termination module including a high side positive terminal, a high side negative terminal, a low side positive terminal, and a low side negative terminal, the high side negative terminal configured to electrically couple to a first positive terminal of the first interconnected battery module, the low side positive terminal configured to electrically couple to a negative terminal of the second interconnected battery module; and a main controller disposed in the first termination module.

In various embodiments, the adaptable battery management system can further comprise a second termination module, the first interconnected battery module and the second interconnected battery module configured to be disposed between the first termination module and the second termination module. The first interconnected battery module can be configured to be one of a plurality of interconnected battery modules in a first row of interconnected battery modules and the second interconnected battery module is configured to be one of the plurality of interconnected battery modules in a second row of interconnected battery modules.

A termination module for an adaptable battery management system is disclosed herein. In various embodiments, the termination module can comprise: a housing: a solid-state disconnect disposed in the housing: a first electrical interface disposed on a first side of the housing, the first electrical interface configured to be physically and electrically coupled to a first interconnected battery module, the first interconnected battery module defining a high-side of a string of battery modules: a first conductive element extending from the first electrical interface to the solid-state disconnect: a second electrical interface disposed on the first side of the housing, the second electrical interface configured to be physically and electrically coupled to a second interconnected battery module, the second interconnected battery module defining a low-side of the string of battery modules; and a second conductive element extending from the second electrical interface to a fuse plug in the housing.

In various embodiments, the first electrical interface defines a first negative terminal, and the second electrical interface defines a first positive terminal.

In various embodiments, the termination module can further comprise a third electrical interface disposed on a second side of the termination module, wherein a pre-charge circuit is disposed in the housing, and wherein the pre-charge circuit is disposed electrically between the second electrical interface and the third electrical interface. In various embodiments, the termination module can further comprise a fourth electrical interface disposed on the second side of the housing, wherein the solid-state disconnect is disposed between the first electrical interface and the fourth electrical interface.

While the principles of this disclosure have been shown in various embodiments, many modifications of structure, arrangements, proportions, elements, materials, and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. An adaptable battery management system, comprising:
   a high side termination module configured to mechanically and electrically couple to a first interconnected battery module, the high side termination module including a high side positive terminal and a high side negative terminal, the high side negative terminal configured to electrically couple to a first positive terminal of the first interconnected battery module;
   a low side termination module configured to mechanically and electrically couple to a second interconnected battery module, the low side termination module including a low side positive terminal and a low side negative terminal, the low side positive terminal configured to electrically couple to a second negative terminal of the second interconnected battery module that is electrically connected to the first interconnected battery module;
   a main controller disposed in one of the high side termination module or the low side termination module; and
   wherein each of the high side termination module and the low side termination module comprise one of a solid state disconnect or a contactor, wherein the solid state disconnect or the contactor is configured to switchably connect and disconnect the electrical coupling of the high side termination module with the first interconnected battery module or the low side termination module with the second interconnected battery module.

2. The adaptable battery management system of claim 1, further comprising a plurality of interconnected battery modules disposed between the high side termination module and the low side termination module.

3. The adaptable battery management system of claim 2, wherein the high side termination module, the low side termination module, and the plurality of interconnected battery modules are in electrical communication.

4. The adaptable battery management system of claim 2, further comprising a plurality of electrical interfaces between the high side termination module and the first interconnected battery module in the plurality of interconnected battery modules, the low side termination module and the second interconnected battery module in the plurality of interconnected battery modules, and adjacent interconnected battery modules in the plurality of interconnected battery modules, wherein each electrical interface in the plurality of electrical interfaces are similar.

5. The adaptable battery management system of claim 2, further comprising a mid-point termination module configured to be disposed between a first set of interconnected battery modules in the plurality of interconnected battery modules and a second set of interconnected battery modules in the plurality of interconnected battery modules, wherein,
   the first set of interconnected battery modules are configured to be disposed between the high side termination module and the mid-point termination module, and
   the second set of interconnected battery modules are configured to be disposed between the low side termination module and the mid-point termination module.

6. The adaptable battery management system of claim 5, wherein the mid-point termination module is configured to provide a reference voltage to the main controller for power conversion.

7. The adaptable battery management system of claim 5, wherein the mid-point termination module includes a service disconnect.

8. The adaptable battery management system of claim 1, wherein the high side termination module and the low side termination module are adaptable for a first battery system with a first number of battery modules and a second battery system with a second number of battery modules, the second number of battery modules being different from the first number of battery modules.

9. The adaptable battery management system of claim 8, wherein a first position of a mid-point termination module in the first battery system is adaptable to any position within a series of battery modules between the high side termination module and the low side termination module.

10. The adaptable battery management system of claim 9, wherein a second position of the mid-point termination module in the second battery system is adaptable to any position within a second series of battery modules between the high side termination module and the low side termination module.

11. A battery system, comprising:
    a plurality of interconnected battery modules, each interconnected battery module in the plurality of interconnected battery modules physically and electrically coupled to an adjacent interconnected battery module in the plurality of interconnected battery modules; and
    a battery management system having a control system configured to manage, protect, and control the battery system, the battery management system comprising:
    a first termination module disposed at a first end of the plurality of interconnected battery modules, the first termination module including a first portion of the control system of the battery system; and
    a second termination module disposed at a second end of the plurality of interconnected battery modules, the second termination module including a second portion of the control system of the battery system, wherein the control system is configured to perform at least one of managing remaining battery voltage, controlling battery charging, calculating data for the battery system, controlling an environment of the battery system, balancing the battery system, or switchably connecting and disconnecting a plurality of interconnected battery modules from an adjacent plurality of interconnected battery modules.

12. The battery system of claim 11, wherein the plurality of interconnected battery modules are electrically coupled without wiring.

13. The battery system of claim 11, further comprising a plurality of electrical interfaces between the first termination module and a first interconnected battery module in the plurality of interconnected battery modules, the second termination module and a second interconnected battery module in the plurality of interconnected battery modules, and adjacent interconnected battery modules in the plurality of interconnected battery modules, wherein each electrical interface in the plurality of electrical interfaces are similar.

14. The battery system of claim 11, further comprising a third termination module, wherein:
a first set of interconnected battery modules in the plurality of interconnected battery modules are disposed between the first termination module and the third termination module, and
a second set of interconnected battery modules in the plurality of interconnected battery modules are disposed between the second termination module and the third termination module.

15. An adaptable battery management system, comprising:
a first string of battery modules;
a second string of battery modules, the first string of battery modules and the second string of battery modules each comprising:
a high side termination module including a first portion of a control system for the respective string of battery modules;
a low side termination module including a second portion of the control system for the respective string of battery modules;
a first parallel module configured to electrically couple each positive terminal in the high side termination module of the first string of battery modules and the second string of battery modules together, the first parallel module having a first positive terminal configured to electrically couple each positive terminal in the high side termination module of the first string of battery modules and the second string of battery modules to a platform; and
a second parallel module configured to electrically couple each negative terminal in the low side termination module of the first string of battery modules and the second string of battery modules together, the second parallel module having a first negative terminal configured to electrically couple each negative terminal in the low side termination module of the first string of battery modules and the second string of battery modules to the platform.

16. The adaptable battery management system of claim 15, each of the first parallel module and the second parallel module comprising:
a first communications interface configured to facilitate communications from the first string of battery modules;
a second communications interface configured to facilitate communications from the second string of battery modules; and
a third communications interface communicatively coupled to the first communications interface and the second communications interface and configured to communicate with the platform.

17. The adaptable battery management system of claim 16, wherein the platform comprises a distribution module electrically coupled to the first positive terminal, the first negative terminal, a second positive terminal of a third parallel module, and a second negative terminal of a fourth parallel module.

18. The adaptable battery management system of claim 17, wherein the distribution module further comprises an output positive terminal and an output negative terminal.

19. The adaptable battery management system of claim 18, wherein the distribution module further comprises a plurality of the output positive terminal and the output negative terminal.

20. A termination module, comprising:
a housing having a first face and a second face, the second face opposite the first face;
a positive electrical terminal disposed on the first face;
a negative electrical terminal disposed on the second face; and
a first portion of a control system for a battery system disposed within the housing, the control system including a second portion disposed in a second distinct termination module.

21. The termination module of claim 20, wherein the first portion includes a solid-state disconnect.

22. The termination module of claim 20, wherein:
the positive electrical terminal is in accordance with a positive terminal of an interconnected battery module in the battery system; and
the negative electrical terminal is in accordance with a negative terminal of the interconnected battery module in the battery system.

23. The termination module of claim 20, further comprising a first mechanical interface on the first face and a second mechanical interface on the second face.

24. An adaptable battery management system, comprising:
a first termination module configured to mechanically and electrically couple to a first interconnected battery module and a second interconnected battery module, the first termination module including a high side positive terminal, a high side negative terminal, a low side positive terminal, and a low side negative terminal, the high side negative terminal configured to electrically couple to a first positive terminal of the first interconnected battery module, the low side positive terminal configured to electrically couple to a negative terminal of the second interconnected battery module;
one of a solid-state disconnect or a contactor disposed in the first termination module, the solid-state disconnect or the contactor configured to switchably connect and disconnect the electrical coupling to the first interconnected battery module and the second interconnected battery module; and
a main controller disposed in the first termination module.

25. The adaptable battery management system of claim 24, comprising a second termination module, the first interconnected battery module and the second interconnected battery module configured to be disposed between the first termination module and the second termination module.

26. The adaptable battery management system of claim 25, wherein the first interconnected battery module is configured to be one of a plurality of interconnected battery modules in a first row of interconnected battery modules and the second interconnected battery module is configured to be one of the plurality of interconnected battery modules in a second row of interconnected battery modules.

27. A termination module for an adaptable battery management system, the termination module comprising:
- a housing;
- a solid-state disconnect disposed in the housing;
- a first electrical interface disposed on a first side of the housing, the first electrical interface configured to be physically and electrically coupled to a first interconnected battery module, the first interconnected battery module defining a high-side of a string of battery modules;
- a first conductive element extending from the first electrical interface to the solid-state disconnect;
- a second electrical interface disposed on the first side of the housing, the second electrical interface configured to be physically and electrically coupled to a second interconnected battery module, the second interconnected battery module defining a low-side of the string of battery modules; and
- a second conductive element extending from the second electrical interface to a fuse plug in the housing.

28. The termination module of claim 27, wherein the first electrical interface defines a first negative terminal, and the second electrical interface defines a first positive terminal.

29. The termination module of claim 28, further comprising a third electrical interface disposed on a second side of the termination module, wherein a pre-charge circuit is disposed in the housing, and wherein the pre-charge circuit is disposed electrically between the second electrical interface and the third electrical interface.

30. The termination module of claim 29, further comprising a fourth electrical interface disposed on the second side of the housing, wherein the solid-state disconnect is disposed between the first electrical interface and the fourth electrical interface.

* * * * *